United States Patent
Nakayama et al.

(10) Patent No.: US 12,500,528 B2
(45) Date of Patent: Dec. 16, 2025

(54) POWER CONVERSION DEVICE

(71) Applicant: Mitsubishi Electric Corporation, Tokyo (JP)

(72) Inventors: Akito Nakayama, Tokyo (JP); Takuya Kajiyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 217 days.

(21) Appl. No.: 18/276,652

(22) PCT Filed: Mar. 31, 2021

(86) PCT No.: PCT/JP2021/013903
§ 371 (c)(1),
(2) Date: Aug. 10, 2023

(87) PCT Pub. No.: WO2022/208759
PCT Pub. Date: Oct. 6, 2022

(65) Prior Publication Data
US 2024/0128888 A1    Apr. 18, 2024

(51) Int. Cl.
*H02M 7/483* (2007.01)
*H02M 1/00* (2007.01)

(52) U.S. Cl.
CPC ....... *H02M 7/4835* (2021.05); *H02M 1/0048* (2021.05); *H02M 7/4833* (2021.05)

(58) Field of Classification Search
CPC . H02M 7/4833; H02M 7/4835; H02M 1/0048
See application file for complete search history.

(56) References Cited

U.S. PATENT DOCUMENTS

2013/0208519 A1*  8/2013  Yamamoto .............. H02M 7/48
                                                              363/67
2020/0161960 A1    5/2020  Mukunoki et al.

FOREIGN PATENT DOCUMENTS

| JP | 2002-233159 A | 8/2002 |
| JP | 2013-198389 A | 9/2013 |
| JP | 2017-163765 A | 9/2017 |

OTHER PUBLICATIONS

Extended European search report dated Feb. 12, 2024, of the corresponding European Patent Application No. EP21934925.5.
International Search Report and Written Opinion mailed on Jun. 8, 2021, received for PCT Application PCT/JP2021/013903, filed on Mar. 31, 2021, 10 pages including English Translation.

* cited by examiner

*Primary Examiner* — Jue Zhang
(74) *Attorney, Agent, or Firm* — XSENSUS LLP

(57) ABSTRACT

A power converter includes at least one arm for each phase, and each arm is formed by connecting, in series, a plurality of converter cells each having a plurality of semiconductor switching elements and a DC capacitor. A control device generates, for each arm, an arm voltage command for the plurality of convener cells, to control the power converter. The control device includes a voltage information calculation unit for calculating a voltage information value on the basis of voltage of at least one DC capacitor in the power converter, and a overall voltage control unit for changing a voltage total value of all the DC capacitors so that the voltage information value becomes close to a set lower limit value.

14 Claims, 21 Drawing Sheets

POWER CONVERSION DEVICE

CROSS-REFERENCE TO RELATED APPLICATION

The present application is based on PCT filing PCT/JP2021/013903, filed Mar. 31, 2021, the entire contents of which are incorporated herein by reference.

TECHNICAL FIELD

The present disclosure relates to a power conversion device.

BACKGROUND ART

In recent years, in a power conversion device, a modular multilevel converter (MMC) formed by connecting a plurality of converter cells each having a power storage element in series in a multiplexed manner has been used for high-voltage application such as a power grid. The MMC with the number of converter cells increased can be easily adapted to a higher-voltage configuration, and is widely applied to power transmission/distribution grids, as a large-capacity static synchronous compensator or an AC/DC power conversion device for high-voltage DC power transmission.

A conventional power conversion device described in Patent Document 1 is a power conversion device using a MMC and is controlled so that the average value of capacitor voltages in a leg becomes constant.

CITATION LIST

Patent Document

Patent Document 1: Japanese Laid-Open Patent Publication No. 2013-198389

SUMMARY OF THE INVENTION

Problems to be Solved by the Invention

In the conventional power conversion device, irrespective of the magnitude of ripple voltages of the capacitors, in order to control the average value of the capacitor voltages in the leg to be constant, a margin is needed for the capacitor voltages and a target value is set to be high. Thus, loss in the converter cells increases, resulting in reduction in power conversion efficiency.

The present disclosure has been made to solve the above problem, and an object of the present disclosure is to provide a high-efficiency power conversion device in which loss in converter cells is reduced by reducing voltages of power storage elements in the converter cells.

Solution to the Problems

A power conversion device according to the present disclosure includes: a power converter which is connected to an AC circuit having a plurality of phases and performs power conversion; and a control device for performing output control of the power converter. The power converter includes, for each phase, at least one arm connected to the corresponding phase of the AC circuit, the arms each being formed by connecting, in series, a plurality of converter cells each having a plurality of semiconductor switching elements and a power storage element. The control device generates an output voltage command for each arm of the power converter, to perform output control of the power converter, and includes a voltage information calculation unit for calculating a voltage information value on the basis of voltage of at least one of the power storage elements in the power converter, and an overall voltage control unit for changing a voltage total value of all the power storage elements in the power converter so that the voltage information value becomes close to a predetermined lower limit value.

Effect of the Invention

The power conversion device according to the present disclosure makes it possible to provide a high-efficiency power conversion device in which loss in converter cells is reduced by reducing voltages of power storage elements in the converter cells.

DESCRIPTION OF EMBODIMENTS

Embodiment 1

Figure 1:
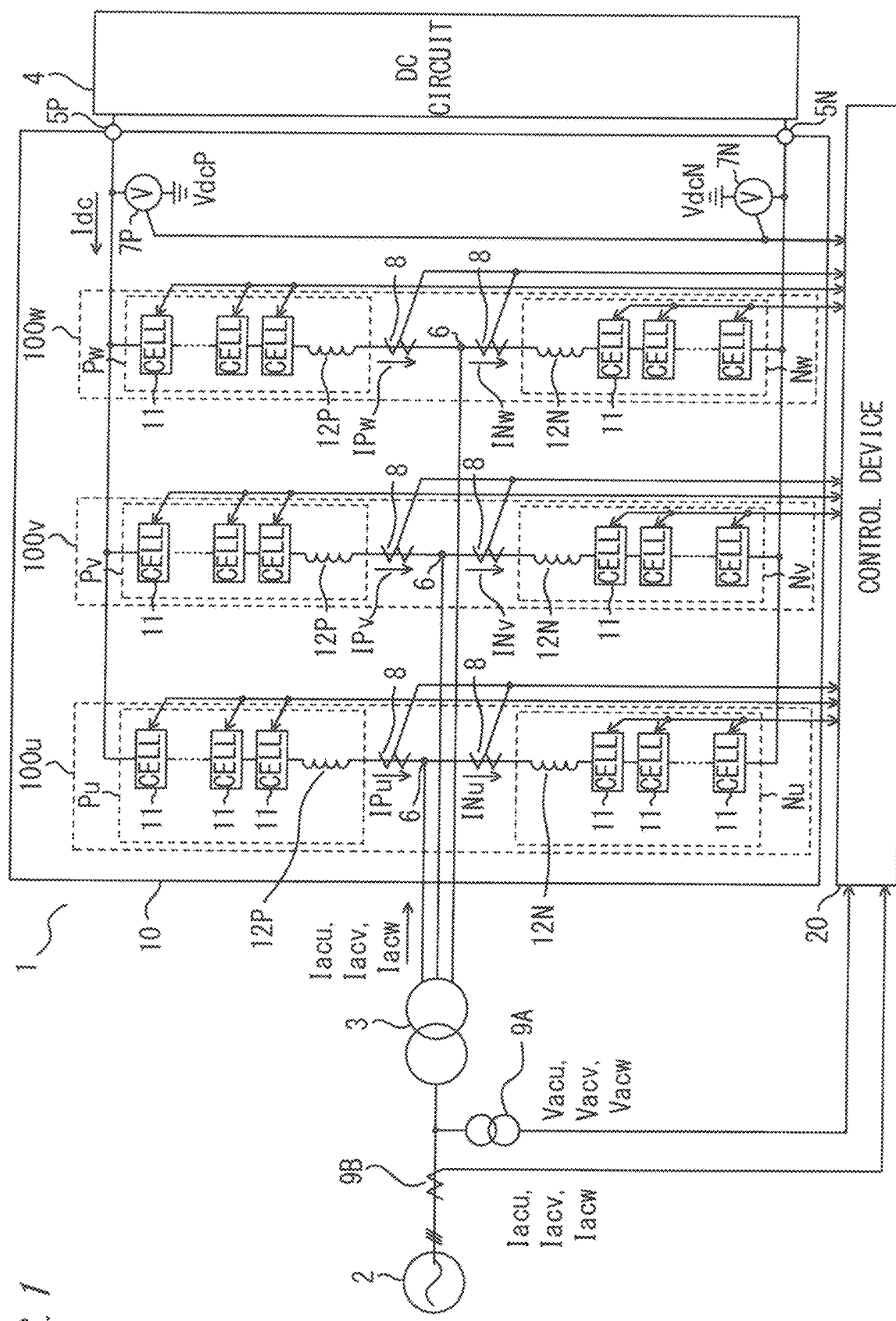
FIG. 1 shows the schematic configuration of a power conversion device according to embodiment 1.

FIG. 1 shows the schematic configuration of a power conversion device according to embodiment 1.

As shown in FIG. 1, a power conversion device 1 includes a power converter 10 which is a main circuit and a control device 20 for performing output control of the power converter 10, and is connected between an AC grid 2 as a three-phase AC circuit and a DC circuit 4.

The power converter 10 has a connection configuration called a double-star type, and includes a plurality of leg circuits 100u, 100v, 100w (referred to as leg circuit 100 when they are collectively mentioned or any of them is mentioned) connected in parallel to each other, between a positive DC terminal 5P and a negative DC terminal 5N which are common DC terminals.

The leg circuit 100 is provided for each of a plurality of phases (in this case, three phases U, V, W) forming AC. The leg circuit 100 is connected between the AC grid 2 and the DC circuit 4, and performs power conversion between AC and DC. AC input terminals 6 respectively provided to the leg circuits 100u, 100v, 100w are connected to the AC grid 2 via a transformer 3.

The positive DC terminal 5P and the negative DC terminal 5N connected in canon to the leg circuits 100 are connected to the DC circuit 4. The DC circuit 4 is, for example, a DC power grid including a DC transmission network and the like, or another power conversion device. In the former case, a high-voltage DC power transmission (HVDC) system is formed. In the latter case, two power conversion devices are connected, and a back to back (BTB) system for connecting two AC grids different in rated frequency or the like is formed.

The leg circuit 100u includes a U-phase upper arm Pu from the positive DC terminal 5P to the AC input terminal 6, and a U-phase lower arm Nu from the negative DC terminal 5N to the AC input terminal 6. The leg circuit 100v includes a V-phase upper arm Pv from the positive DC terminal 5P to the AC input terminal 6, and a V-phase lower arm Nv from the negative DC terminal 5N to the AC input terminal 6. The leg circuit 100w includes a W-phase upper arm Pw from the positive DC terminal 5P to the AC input terminal 6, and a W-phase lower arm Nw from the negative DC terminal 5N to the AC input terminal 6.

That is, the upper arms Pu, Pv, Pw for the respective phases and the lower arms Nu, Nv, Nw for the respective phases are connected in series to each other, and the connection points therebetween are the AC input terminals 6 for the respective phases.

The leg circuits 100u, 100v, 100w have the same configuration, and therefore the leg circuit 100u for U phase will be described as a representative.

The arm Pu is formed by connecting a plurality of (N) converter cells 11 and a reactor 12P in series. Similarly, the arm Nu is formed by connecting a plurality of (N) converter cells 11 and a reactor 12N in series.

The position where the reactor 12P is interposed may be any position in the arm Pu, and the position where the reactor 12N is interposed may be any position in the arm Nu.

Each of the reactors 12P, 12N may be composed of a plurality of reactors, and the reactors may have different inductance values. Only one of the reactors 12P, 12N may be provided and the other may be omitted.

In this case, although the configuration in which the AC input terminals 6 are connected to the AC grid 2 via the transformer 3 has been shown, the AC input terminals 6 may be connected to the AC grid 2 via an interconnection reactor instead of the transformer 3.

Instead of the AC input terminals 6 for the respective phases, primary windings may be provided to the leg circuits 100u, 100v, 100w, and the leg circuits 100u, 100v, 100w may be electrically connected to the transformer 3 via secondary windings magnetically coupled to the primary windings. In this case, the reactors 12P, 12N may be used as the primary windings for the respective phases.

That is, the upper arms Pu, Pv, Pw for the respective phases and the lower arms Nu, Nv, Nw for the respective phases are connected to each other via connection parts such as the AC input terminals 6 or the primary windings, and are electrically connected to the AC grid 2 via the connection parts.

The power conversion device 1 further includes DC voltage detectors 7P, 7N, arm current detectors 8 respectively provided to the arms Pu, Nu, Pv, Nv, Pw, Nw, an AC voltage detector 9A, and an AC current detector 9B, as detectors for electric quantities (current, voltage, etc.) used for control. Signals from the detectors are inputted to the control device 20 via signal lines.

The signal lines are formed by optical fibers, for example. In FIG. 1, for convenience sake, the signal lines for signals inputted from the detectors to the control device 20 are shown collectively in part. Similarly, signal lines for signals inputted/outputted between the control device 20 and the converter cells 11 are shown collectively in part. The signal lines between the control device 20 and the converter cells 11 may be provided for transmission and for reception, separately.

Hereinafter, each detector will be specifically described.

The DC voltage detector 7P detects DC voltage VdcP of the positive DC terminal 5P. The DC voltage detector 7N detects DC voltage VdcN of the negative DC terminal 5N. A difference between the DC voltage VdcP and the DC voltage VdcN is defined as DC voltage Vdc.

The arm current detectors 8 respectively provided to the arms Pu, Nu, Pv, Nv, Pw, Nw detect arm currents IPu, INu, IPv, INv, IPw, INw flowing through the respective arms Pu, Nu, Pv, Nv, Pw, Nw. In the following description, the arm currents IPu, IPv, IPw are collectively referred to as upper arm currents IAP, the arm currents INu, INv, INw are collectively referred to as lower arm currents IAN, and the upper arm current IAP and the lower arm current IAN are collectively referred to as arm currents IA.

The AC voltage detector 9A detects AC voltage Vacu for U phase, AC voltage Vacv for V phase, and AC voltage Vacw for W phase of the AC grid 2. In the following description, Vacu, Vacv, and Vacw are collectively referred to as Vac.

The AC current detector 9B detects AC current Iacu for U phase, AC current Iacv for V phase, and AC current Iacw for N phase of the AC grid 2. In the following description, Iacu, Iacv, and Iacw are collectively referred to as Iac.

Regarding the polarity of the DC current Idc inputted/outputted via the positive DC terminal 5P, and the polarities of the arm currents IA and the AC currents Iac, the directions of arrows in the drawing are positive directions.

Figure 2:
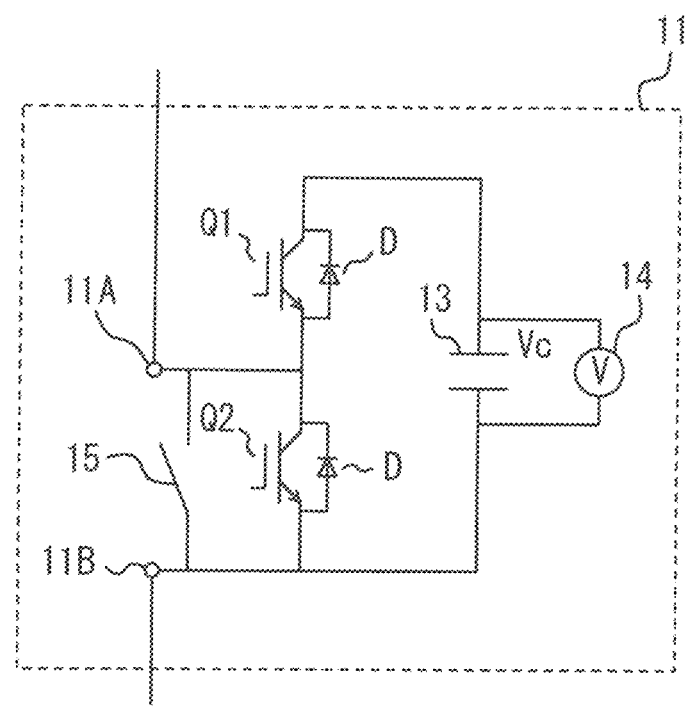
FIG. 2 shows a configuration example of a converter cell according to embodiment 1.
Figure 3:
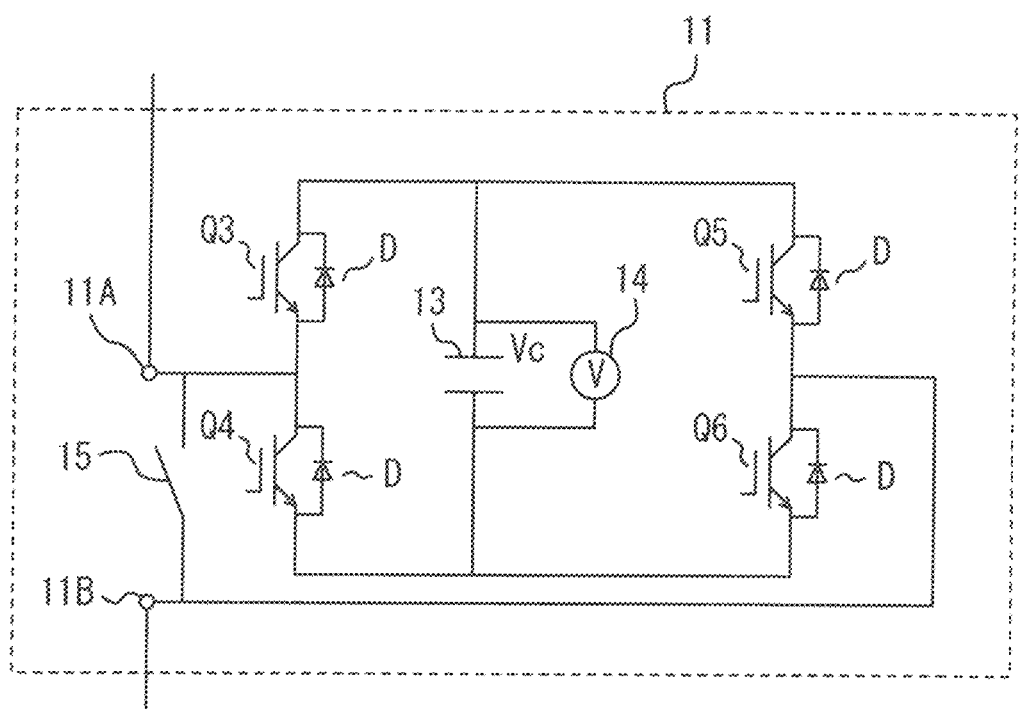
FIG. 3 shows a configuration example of a converter cell according to embodiment 1.

FIG. 2 and FIG. 3 show configuration examples of each converter cell 11 in the power converter 10.

The converter cell 11 shown in FIG. 2 has a circuit configuration called a half-bridge configuration.

The converter cell 11 includes a series unit formed by connecting, in series, two semiconductor switching elements (hereinafter, simply referred to as switching elements) Q1, Q2 to which diodes D are connected in antiparallel, a DC capacitor 13 as a power storage element, a voltage detector 14, and a bypass switch 15. The series unit of the switching elements Q1, Q2, and the DC capacitor 13, are connected in parallel.

In this case, both terminals of the switching element Q2 serve as input/output terminals 11A, 11B of the converter cell 11. Through switching operations of the switching elements Q1, Q2, voltage Vc across the DC capacitor 13 or zero voltage is outputted. Fc-z example, when the switching element Q1 is ON and the switching element Q2 is OFF, the voltage Vc across the DC capacitor 13 is outputted. When the switching element Q1 is OFF and the switching element Q2 is on, zero voltage is outputted.

The voltage detector 14 detects the voltage Vc across the DC capacitor 13. The bypass switch 15 is connected between the input/output terminals 11A, 11B. For example, in a case where the AC grid 2 is abnormal, the bypass switch 15 is turned on, so that the converter cell 11 is short-circuited, whereby the switching elements Q1, Q2 in the converter cell 11 are protected from overcurrent.

The converter cell 11 shown in FIG. 3 has a circuit configuration called a full-bridge configuration. The converter cell 11 includes a first series unit formed by connecting, in series, two semiconductor switching elements (hereinafter, simply referred to as switching elements) Q3, Q4 to which diodes D are connected in antiparallel, a second series unit similarly formed by connecting, in series, two semiconductor switching elements (hereinafter, simply referred to as switching elements) Q5, Q6 to which diodes G are connected in antiparallel, a DC capacitor 13, a voltage detector 14, and a bypass switch 15. The first series unit of the switching elements Q3, Q4, the second series unit of the switching elements Q5, Q6, and the DC capacitor 13 are connected in parallel.

In this case, a middle point of the first series unit of the switching elements Q3, Q4 and a middle point of the second series unit of the switching elements Q5, Q6 serve as input/output terminals 11A, 11B of the converter cell 11. Through switching operations of the switching elements Q3 to Q6, positive/negative voltage Vc across the DC capacitor 13 or zero voltage is outputted.

As in the converter cell 11 shown in FIG. 2, the voltage detector 14 detects the voltage Vc across the DC capacitor 13. The bypass switch 15 is connected between the input/output terminals 11A, 11B. The voltage Vc across the DC capacitor 23 may be referred to as voltage Vc of the DC capacitor 13 or capacitor voltage Vc.

As the switching elements Q1 to 06 in the converter cell 11 shown in FIG. 2 and FIG. 3, for example, self-turn-off semiconductor switching elements such as an insulated gate bipolar transistor (IGBT), a gate commutated turn-off (GCT), or a thyristor, are used. As the DC capacitor 13, a film capacitor is mainly used.

In the following description, the converter cell 11 having a half-bridge configuration shown in FIG. 2 is used.

The converter cell 11 may have a configuration other than the above ones, and may have a circuit configuration called a clamped double cell, for example. Also, the switching elements Q1 to Q6 and the DC capacitor 13 are not limited to the above ones.

Next, the configuration of the control device 20 will be described.

As described above, the control device 20 receives the DC voltages VdcP, VdcN, the arm currents IA of the arms Pu, Nu, Pv, Nv, Pw, Nw, the AC voltages Vac for the respective phases, the AC currents Iac for the respective phases, and the capacitor voltages Vc of the converter cells 11, which are detected values. Then, on the basis of the received information, the control device 20 generates and outputs gate signals g for driving the switching elements Q1, Q2 of each converter cell 11.

Figure 4:
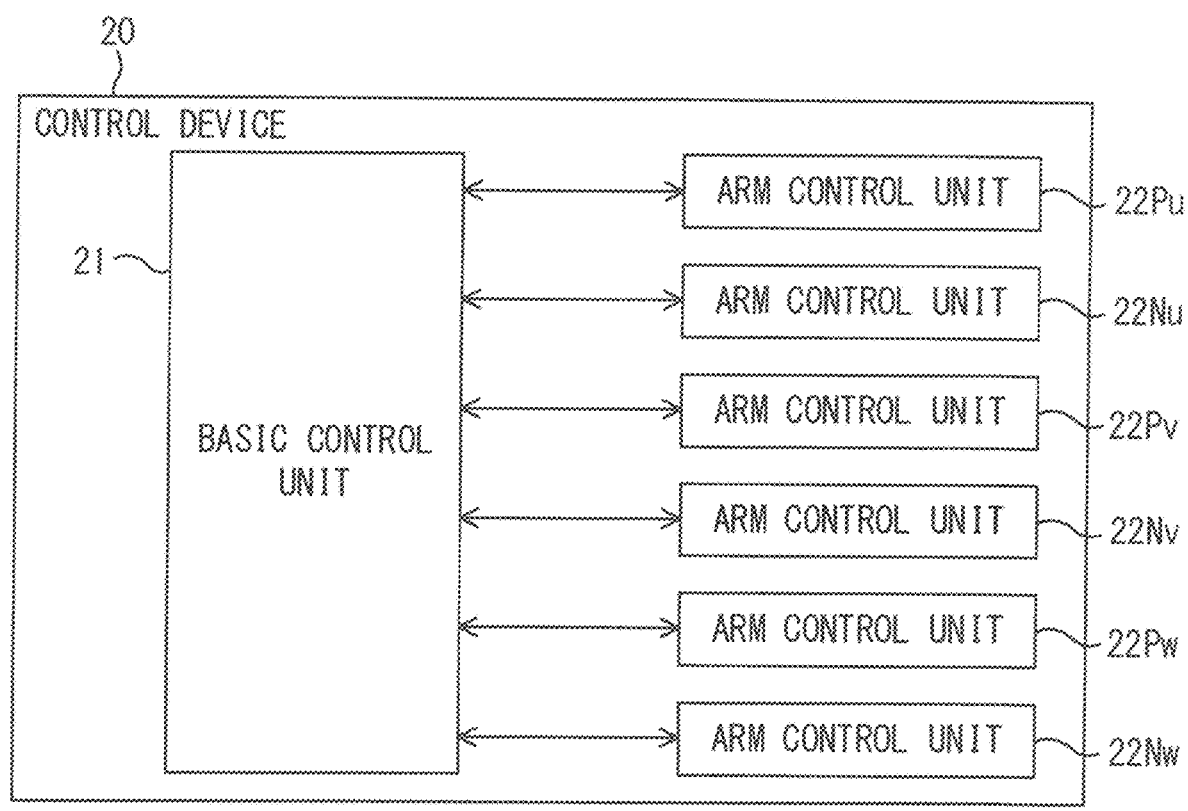
FIG. 4 is a block diagram showing the schematic configuration of a control device according to embodiment 1.

FIG. 4 is a block diagram showing the schematic configuration of the control device 20.

As shown in FIG. 4, the control device 20 includes a basic control unit 21, and arm control units 22Pu, 22Nu, 22Pv, 22Nv, 22Pw, 22Nw respectively provided for the arms Pu, Nu, Pv, Nv, Pw, Nw.

In the following description, the arm control units 22Pu, 22Nu, 22Pv, 22Nv, 22Pw, 22Nw for the arms Pu, Nu, Pv, Nv, Pw, Nw may be collectively referred to as arm control units 22.

Figure 5:
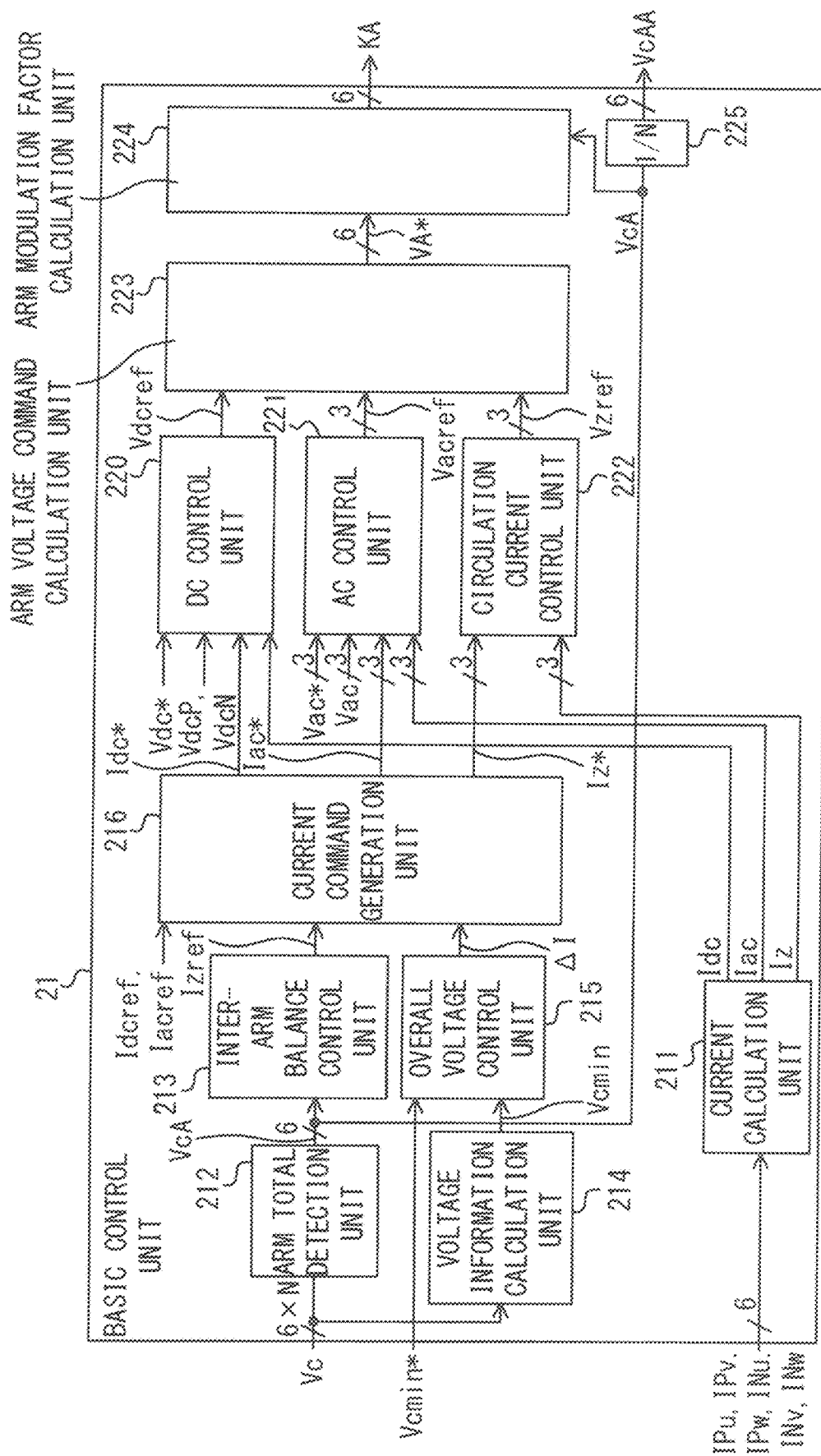
FIG. 5 is a block diagram showing the configuration of a basic control unit of the control device according to embodiment 1.

FIG. 5 is a block diagram showing the configuration of the basic control unit 21 of the control device 20.

As shown in FIG. 5, the basic control unit 21 includes a current calculation unit 211, an arm total detection unit 212, an inter-arm balance control unit 213, a voltage information calculation unit 214, an overall voltage control unit 215, and a current command generation unit 216. Further, the basic control unit 21 includes a DC control unit 220, an AC control unit 221, a circulation current control unit 222, an arm voltage command calculation unit 223, an arm modulation factor calculation unit 224, and a divider 225.

The current calculation unit 211 receives the arm currents IPu, INu, IPv, INv, IPw, INw detected by the arm current detectors 8 and flowing through the arms Pu, Nu, Pv, Nv, Pw, Nw. The current calculation unit 211 calculates the DC current Idc and the AC currents Iac for the respective phases, and further calculates the circulation currents Izu, Izv, Izw flowing through the leg circuits 100$u$, 100$v$, 100$w$ for the respective phases. In the following description, Izu, Izv, and Izw are collectively referred to as Iz.

The DC current Idc and the circulation current Iz for each phase can be calculated by the following expressions. The circulation current Iz for each phase is current circulating among the plurality of leg circuits 100 in the power converter 10 without flowing to the AC side and the DC side.

$$Idc=(IPu+IPv+IPw=INu+INv+INw)/2$$

$$Iz=(IAP+IAN)/2-Idc/3$$

The capacitor voltages Vc of the DC capacitors 13 detected by the voltage detectors 14 of the respective converter cells 11 are inputted to the arm total detection unit 212 and the voltage information calculation unit 214 in the basic control unit 21. The arm total detection unit 212 calculates capacitor voltage totals VcAPu, VcANu, VcAPv, VcANv, VcAPw, VcANw (when collectively mentioned, they are referred to as capacitor voltage totals VcA) which are the totals of the capacitor voltages Vc, for each of the arms Pu, Nu, Pv, NV, Pw, Nw. The arm control unit 22 for each of the arms Pu, Nu, Pv, Nv, Pw, Nw receives N capacitor voltages Vc of the converter cells 11.

The inter-arm balance control unit 213 generates a circulation current command Izref so that outputs are balanced among the arms Pu, Nu, Pv, Nv, Pw, Nw, on the basis of the capacitor voltage totals VcA for the respective arms Pu, Nu, Pv, Nv, Pw, Nw.

The voltage information calculation unit 214 calculates a voltage information value Vcmin on the basis of a minimum voltage value Vcmina which is the minimum value among the inputted capacitor voltages Vc. That is, the voltage information calculation unit 214 calculates the voltage information value Vcmin on the basis of the minimum voltage value Vcmina among the voltages Vc of all the DC capacitors 13 in the power converter 10.

On the basis of the voltage information value Vcmin of the DC capacitors 13 and a predetermined lower limit value Vcmin*, the overall voltage control unit 215 calculates and outputs a current value ΔI so that the voltage information value Vcmin becomes close to the lower limit value Vcmin*. The current value al is such a current command value that generates active power for changing the voltage total value of all the DC capacitors 13 in the power converter 10.

The details of the voltage information calculation unit 214 and the overall voltage control unit 215 will be described later.

The current command generation unit 216 receives a predetermined DC current command Idcref, a predetermined AC current command Iacref, the circulation current command Izref from the inter-arm balance control unit 213, and the current value ΔI from the overall voltage control unit 215. On the basis of the above received information, the current command generation unit 216 calculates a DC current command Idc*, an AC current command Iac* for each phase, and a circulation current command Iz* for each phase, as current commands for the power converter 10. The current value ΔI from the overall voltage control unit 215 is reflected in at least one of the DC current command Idc* and the AC current command Iac*.

The DC control unit 220 receives a predetermined DC voltage command Vdc*, and the DC voltages VdcP, VdcN detected by the DC voltage detectors 7P, 7N. The DC control unit 220 further receives the DC current command Idc* generated by the current command generation unit 216 and the DC current Idc from the current calculation unit 211.

The DC control unit 220 calculates voltage between the DC terminals of the DC circuit 4, i.e., the DC voltage Vdc, from the DC voltages VdcP, VdcN. Then, the DC control unit 220 generates a DC voltage command Vdcref for controlling each of the arms Pu, Nu, Pv, Nv, Pw, Nw so that the DC voltage Vdc becomes close to the DC voltage command Vdc* and the DC current Idc becomes close to the DC current command Idc*. The generated DC voltage command Vdcref is inputted to the arm voltage command calculation unit 223.

The AC control unit 221 receives predetermined AC voltage commands Vac*, and the AC voltages Vac for the respective phases detected by the AC voltage detectors 9A. The AC control unit 221 further receives the AC current commands Iac* for the respective phases generated by the current command generation unit 216 and the AC currents Iac for the respective phases from the current calculation unit 211. As the AC currents Iac for the respective phases, values detected by the AC current detector 98 may be used.

The AC control unit 221 generates AC voltage commands Vacref for the respective phases for controlling the arms Pu, Nu, Pv, Nv, Pw, Nw so that the AC voltages Vac become close to the AC voltage commands Vac* and the AC currents Iac become close to the AC current commands Iac*. The generated AC voltage commands Vacref are inputted to the arm voltage command calculation unit 223.

The circulation current control unit 222 receives the circulation current commands Iz* for the respective phases generated by the current command generation unit 216 and the circulation currents Iz for the respective phases from the current calculation unit 211. The circulation current control unit 222 generates circulation voltage commands Vzref for the respective phases for controlling the arms Pu, Nu, Pv, Nv, Pw, Nw so that the circulation currents Iz become close to the circulation current commands Iz*. The generated circulation voltage commands Vzref are inputted to the arm voltage command calculation unit 223.

The arm voltage command calculation unit 223 receives the DC voltage command Vdcref from the DC control unit 220, the AC voltage commands Vacref for the respective phases from the AC control unit 221, and the circulation voltage commands Vzref for the respective phases from the circulation current control unit 222. Then, the arm voltage command calculation unit 223 generates arm voltage commands VAPu*, VANu*, VAPv*, VANv*, VAPw*, VANw* (when collectively mentioned, they are referred to as arm voltage commands VA*) as output voltage commands for the respective arms Pu, Nu, Pv, Nv, Pw, Nw.

For example, the arm voltage commands VAPu*, VANu* for U phase are represented by the following expressions using the DC voltage command Vdcref, the AC voltage command Vacuref for U phase, and the circulation voltage command Vzuref for U phase. The same applies to V phase and W phase.

$$VAPu^* = Vdcref - Vacuref + Vzuref$$

$$VANu^* = Vdcref + Vacuref + Vzuref$$

The arm modulation factor calculation unit 224 receives the arm voltage commands VA*, and the capacitor voltage totals VcA for the arms Pu, Nu, Pv, Nv, Pw, Nw outputted from the arm total detection unit 212. Then, the arm modulation factor calculation unit 224 generates arm modulation factors KAEu, KANu, KAPv, KANv, KAPw, KANw (when collectively mentioned, they are referred to as arm modulation factors KA) for the respective arms Pu, Nu, Pv, Nv, Pw, Nw. For example, the arm modulation factor KAPu for the arm Pu is obtained by dividing the arm voltage command VAPu* for the arm Pu by the capacitor voltage total VcAPu of the arm Pu.

The divider 225 divides the capacitor voltage total VcA of each of the arms Pu, Nu, Pv, Nv, Pw, Nw by the number N of the converter cells 11 in each arm, and outputs capacitor voltage averages VcAAPu, VcAANu, VcAAPv, VcAANv, VcAAPw, VcAANw (when collectively mentioned, they are referred to as capacitor voltage averages VcAA) for the respective arms Pu, Nu, Pv, Nv, Pw, Nw.

The basic control unit 21 outputs the arm modulation factors KA and the capacitor voltage averages VcAA for the respective arms Pu, Nu, Pv, Nv, Pw, Nw. The outputted arm modulation factors KA and capacitor voltage averages VcAA for the respective arms Pu, Nu, Pv, Nv, Pa, Nw are inputted to the corresponding arm control units 22Pu, 22Nu, 22Pv, 22Nv, 22Pw, 22Nw for the respective arms.

Figure 6:
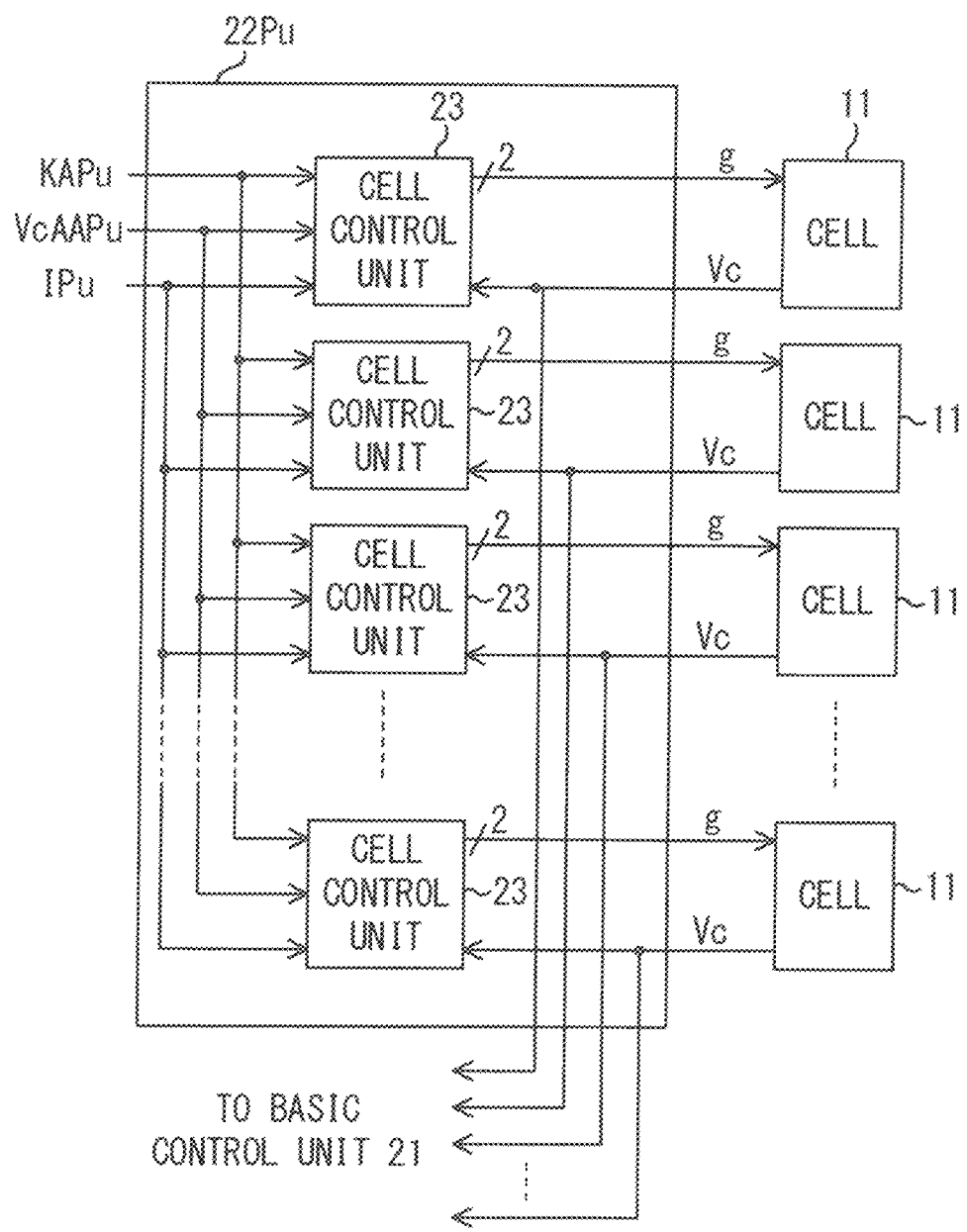
FIG. 6 is a block diagram showing the configuration of an arm control unit of the control device according to embodiment 1.

FIG. 6 is a block diagram showing the configuration of each arm control unit 22 of the control device 20. Here, the arm control unit 22Pu for the arm Pu on the positive side for U phase is shown. The arm control units 22Nu, 22Pv, 22Nv, 22Pw, 22Nw for the other arms Nu, Pv, Nv, Pw, Nw also have the same configuration.

As shown in FIG. 6, the arm control unit 22Pu for the arm Pu includes, for each converter cell 11 in the arm Pu, a cell control unit 23 that controls the converter cell 11 individually.

The arm control unit 22Pu receives the arm modulation factor KAPu and the capacitor voltage average VcAAPu which are information about the arm Pu, from the basic control unit 21, and further receives the arm current IPu detected by the arm current detector 8. The above received information is inputted to the cell control unit 23 for controlling each converter cell 11.

Each cell control unit 23 is capable of communicating with the corresponding converter cell 11, and receives the capacitor voltage Vc of the converter cell 11 obtained by the voltage detector 14. Then, the cell control unit 23 uses the received capacitor voltage Vc tor control calculation and transmits the same to the basic control unit 21.

Each cell control unit 23 controls' the converter cell 11 that is a control target so that the capacitor voltage Vc of the converter cell 11 becomes close to the capacitor voltage average VcAAPu in the arm Pu.

More specifically, the cell control unit 23 calculates a controlled variable from arm current IPu and a deviation between the capacitor voltage average VcAAPu and the corresponding capacitor voltage Vc, and superimposes the controlled variable on the arm modulation factor KAPu, to correct the arm modulation factor KAPu. Then, on the basis of the corrected arm modulation factor KAPu, the cell control unit 23 generates and outputs gate signals e for driving the switching elements Q1, Q2 of each converter cell 11 through modulation by a known triangular-wave carrier comparison method, for example.

Figure 7:
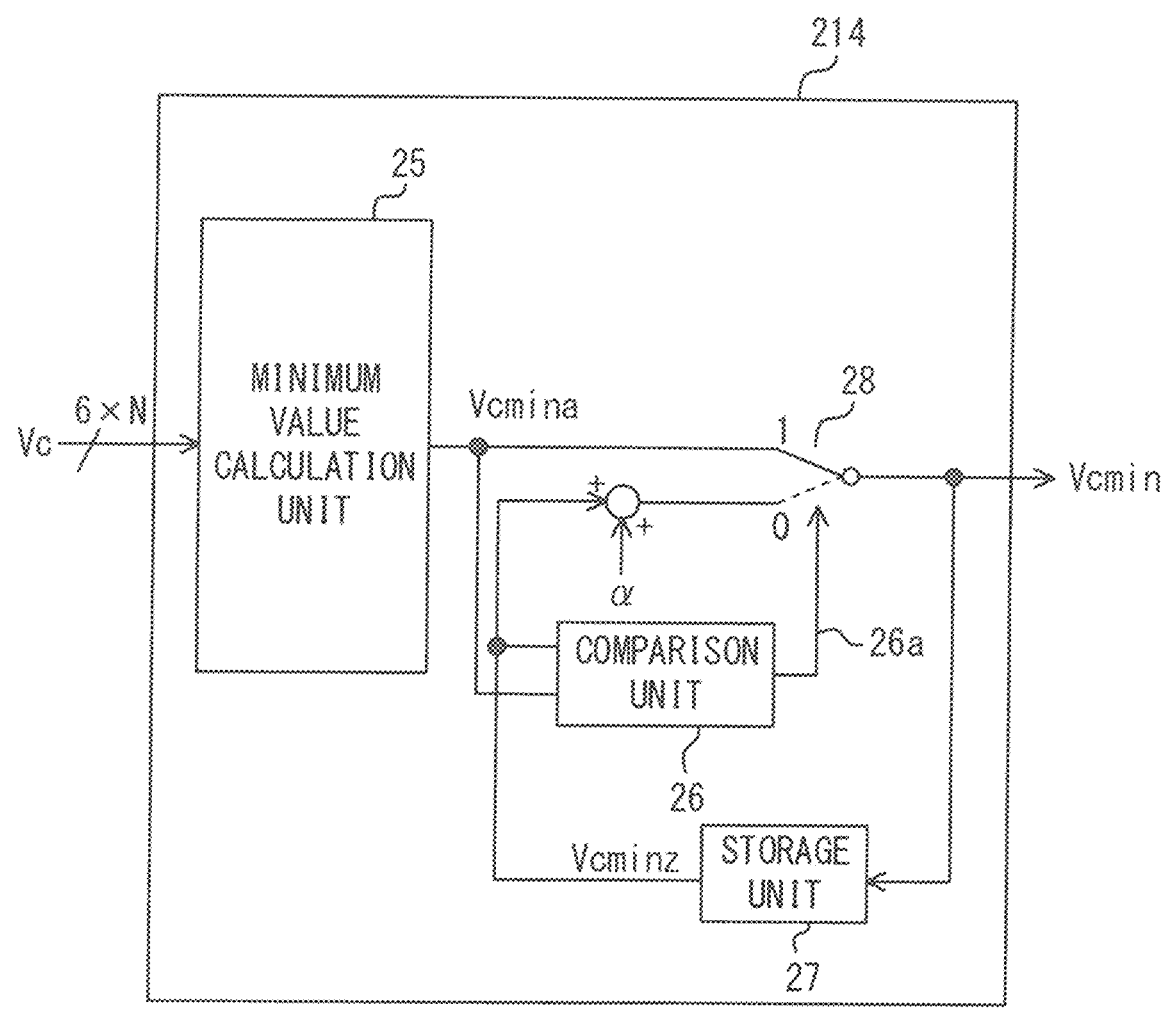
FIG. 7 is a block diagram showing the configuration of a voltage information calculation unit of the basic control unit according to embodiment 1.

FIG. 7 is a block diagram showing the configuration of the voltage information calculation unit 214 of the basic control unit 21.

As shown in FIG. 7, the voltage information calculation unit 214 includes a minimum value calculation unit 25, a comparison unit 26, a storage unit 27, and a switchover unit 26, and calculates the voltage information value Vcmin on the basis of the minimum voltage value Vcmina which is the minimum value among the inputted capacitor voltages Vc. That is, the voltage information value Vcmin outputted from the voltage information calculation unit 214 is a value based on the minimum voltage value Vcmina which is voltage of at least one of the DC capacitors 13 in the power converter 10.

The voltage information calculation unit 214 receives the capacitor voltages Vc of all the DC capacitors 13 in the power converter 10, and outputs the voltage information value Vcmin calculated at an update cycle that is an integer multiple of the control cycle of the control device 20. The voltage information calculation unit 214 may receive the capacitor voltages Vc of all the sound converter cells 11 other than the converter cell 11 that does not contribute to operation of the power converter 10 because of failure or the like.

The minimum value calculation unit 25 outputs the minimum voltage value Vcmina which is the minimum value among the received capacitor voltages Vc. The minimum voltage value Vcmina may be calculated by a function block other than the voltage information calculation unit 214 and the value may be acquired.

The storage unit 27 stores the voltage information value Vcmin which is the output of the voltage information calculation unit 214, and outputs the stored value as a held value Vcminz after one update cycle.

The comparison unit 26 compares the minimum voltage value Vcmina from the minimum value calculation unit 25 with the held value Vcminz from the storage unit 27, and outputs a switchover signal 26a to the switchover unit 28. A positive set value α is added to the held value Vcminz, the switchover unit 28 selects one of the post-addition held value (Vcminz+α) or the minimum voltage value Vcmina by the switchover signal 26a, and the selected value as the voltage information value Vcmin is outputted from the voltage information calculation unit 214.

In a case of (Vcmina≤Vcminz), the comparison unit 26 outputs 1 as the switchover signal 26a, the switchover unit 28 selects the minimum voltage value Vcmina, and the minimum voltage value Vcmina is outputted as the voltage information value Vcmin from the voltage information calculation unit 214.

In a case of (Vcmina>Vcminz), the comparison unit 26 outputs 0 as the switchover signal 26a, the switchover unit 28 selects the post-addition held value (Vcminz+α), and the value (Vcminz+α) is outputted as the voltage information value Vcmin from the voltage information calculation unit 214.

The positive set value α is a value smaller than a difference (Vcmina−Vcminz) between the minimum voltage value Vcmina and the held value Vcminz. For example, the set value α may be set at a constant X, and if the value (Vcmina−Vcminz) is not greater than the constant X, α may be set at 0.

Figure 8:
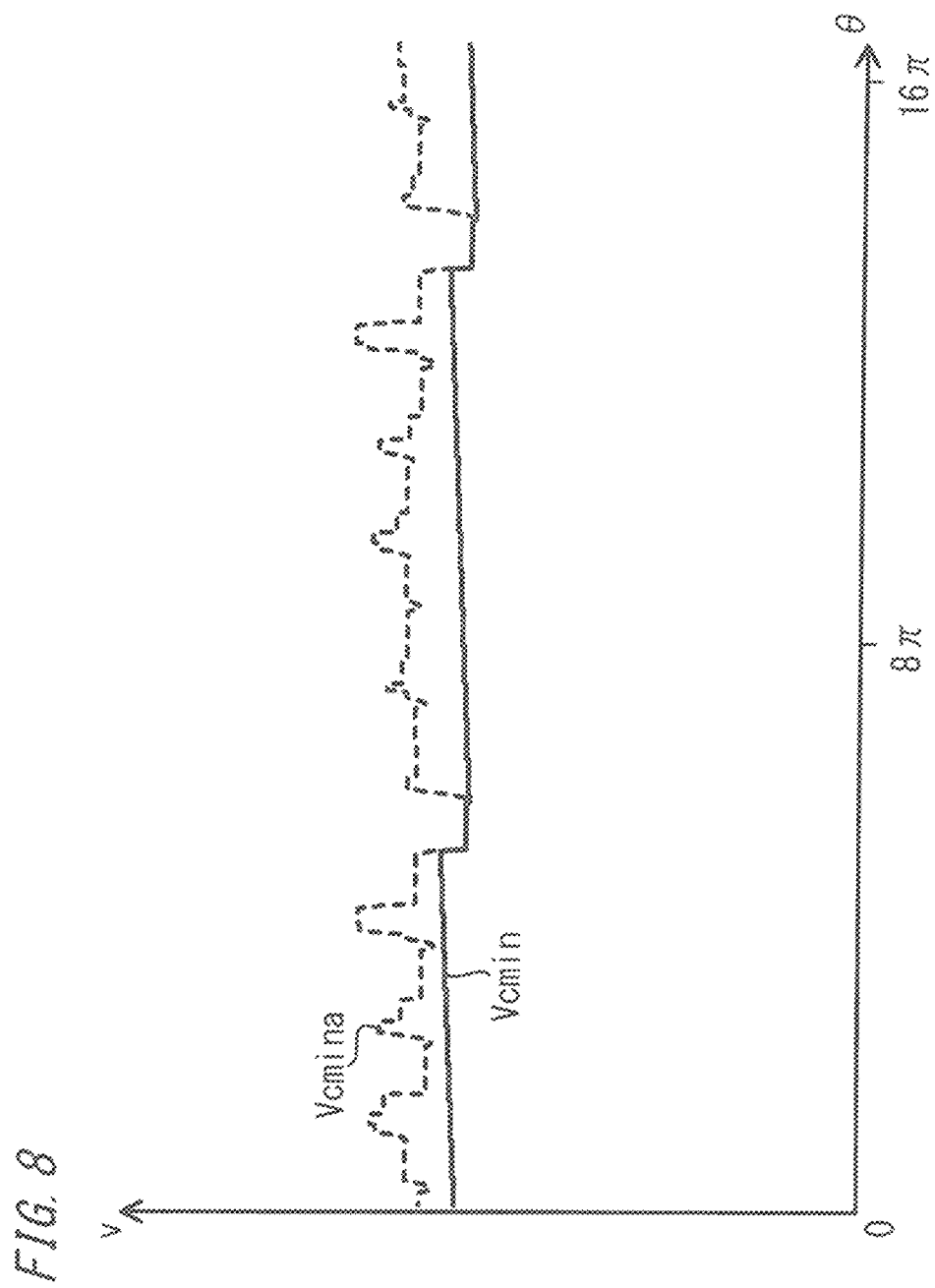
FIG. 8 is a waveform diagram illustrating a voltage information value according to embodiment 1.

FIG. 8 is a waveform diagram illustrating the voltage information value Vcmin. The capacitor voltage Vc which is the instantaneous voltage of each DC capacitor 13 fluctuates in accordance with ripple voltage, and the minimum voltage value Vcmina of the fluctuating 6N capacitor voltages Vc fluctuates comparatively greatly and complicatedly with respect to the time axis, as shown by a dotted line in FIG. 8. The voltage information value Vcmin shown by a solid line becomes such a value as to represent an envelope of local minimums of the minimum voltage value Vcmina with respect to the time axis.

Figure 9:
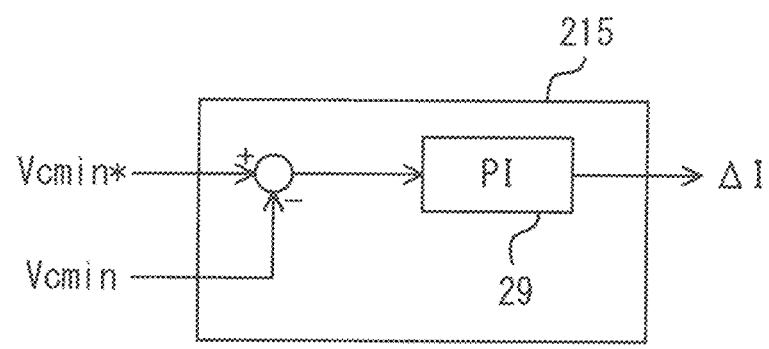
FIG. 9 is a block diagram showing the configuration of an overall voltage control unit of the basic control unit according to embodiment 1.

FIG. 9 is a block diagram showing the configuration of the overall voltage control unit 215 of the basic control unit 21.

As shown in FIG. 9, the overall voltage control unit 215 receives the voltage information value Vcmin outputted from the voltage information calculation unit 214 and the predetermined lower limit value Vcmin*. Then, a deviation obtained by subtracting the lower limit value Vcmin* from the voltage information value Vcmin is controlled to become close to 0 by a PI controller 29, and thus the current value ΔI is outputted.

That is, the outputted current value ΔI is such a current command value that active power for changing the voltage total value of all the DC capacitors 13 in the power converter 10 so that the voltage information value Vcmin becomes close to the lower limit value Vcmin*, flows in/out.

Here, changing the voltage total value of all the DC capacitors 13 is the same as changing the voltage average value of the DC capacitors 13.

In this case, regarding the DC current Idc and the AC current Iac, the direction in which current flows into the power converter 10, i.e., the current direction for charging the DC capacitors 13 in the converter cell 11, is defined as positive.

For example, in a case where the voltage information value Vcmin is greater than the lower limit value Vcmin*, the current value ΔI becomes a negative value. The current value ΔI is inputted to the current command generation unit 216, which reduces the AC current command Iac* for the same phase component as the AC voltage Vac, for example. Thus, active power flows out from the power converter 10 to the AC grid 2 side, and the voltage total value of all the DC capacitors 13 in the power converter 10 is reduced. As a result, the voltage information value Vcmin becomes close to the lower limit value Vcmin*.

In this case, the current value ΔI is reflected in the AC current command Iac* and active power flows in/out on the AC side. However, the current value ΔI may be reflected in the DC current command Idc* and active power may flow in/out on the DC side. In addition, active power may flow in/out on both of the DC side and the AC side.

As described above, in this embodiment, the voltage information calculation unit 214 is provided for calculating the voltage information value Vcmin on the basis of the minimum voltage value Vcmina of the capacitor voltages Vc, and the overall voltage control unit 215 is provided for changing the voltage total value of all the DC capacitors 13 so that the voltage information value Vcmin becomes close to the predetermined lower limit value Vcmin*. Therefore, it is possible to achieve voltage reduction while ensuring minimum necessary voltage for all the capacitor voltages Vc.

The DC capacitor 13 of each converter cell 11 may supply a power source to a driving device for driving the switching elements Q1, Q2 or supply power to an operation power source for the control device 20, for example. In this case, the capacitor voltage Vc needs to be greater than voltage for enabling supply of such a power source, and the voltage can be made as small as possible while minimum necessary voltage is ensured.

The lower limit value Vcmin* is set at minimum necessary voltage for the capacitor voltage Vc.

Thus, loss in each converter cell 11, e.g., switching loss occurring in the switching elements Q1, Q2 or loss occurring in a resistance element (e.g., voltage detector 14) connected in parallel to the DC capacitor 13, can be reduced, so that conversion efficiency of the power conversion device 1 is improved.

Embodiment 2

In the above embodiment 1, the voltage information value Vcmin based on the minimum voltage value Vcmina of the capacitor voltages Vc is calculated and used for changing the voltage total value of all the DC capacitors 13, whereas in the present embodiment, a different voltage information value is used. Also in embodiment 2, the same power converter 10 as in the above embodiment 1 is used, and the control device 20 includes a basic control unit 21A, and the same arm control units 22Pu, 22Nu, 22Pv, 22Nv, 22Pw, 22Nw as in the above embodiment 1 respectively provided for the arms Pu, Nu, Pv, Nv, Pw, Nw.

Figure 10:
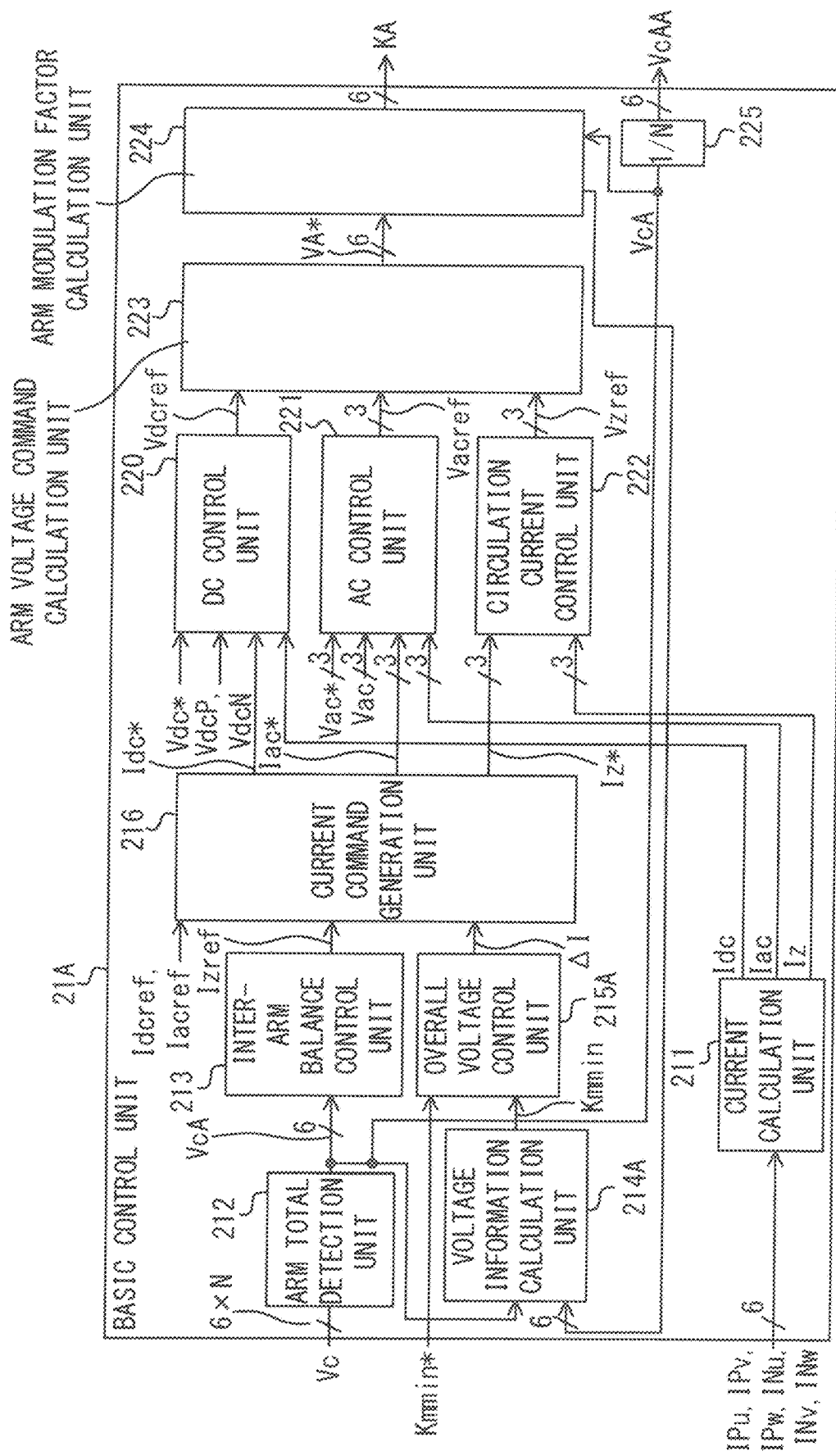
FIG. 10 is a block diagram showing the configuration of a basic control unit of a control device according to embodiment 2.

FIG. 10 is a block diagram showing the configuration of the basic control unit 21A of the control device 2C according to embodiment 2.

As shown in FIG. 10, the basic control unit 21A includes the current calculation unit 211, the arm total detection unit 212, the inter-arm balance control unit 213, a voltage information calculation unit 214A, an overall voltage control unit 215A, and the current command generation unit 216. Further, the basic control unit 21A includes the DC control unit 220, the AC control unit 221, the circulation current control unit 222, the arm voltage command calculation unit 223, the arm modulation factor calculation unit 224, and the divider 225.

The voltage information calculation unit 214A and the overall voltage control unit 215A will be described in detail below. The other parts are the same as in the above embodiment 1.

Figure 11:
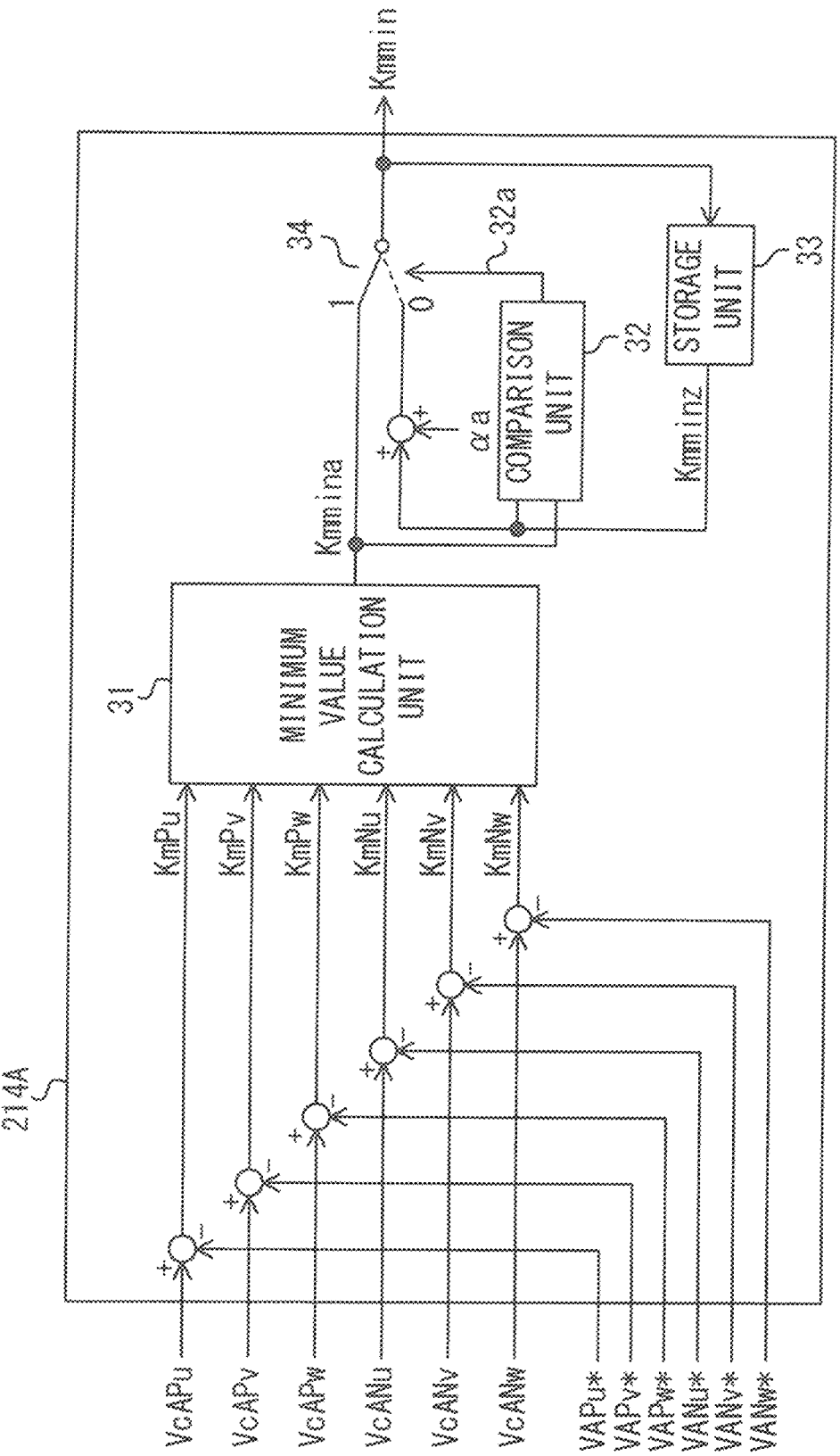
FIG. 11 is a block diagram showing the configuration of a voltage information calculation unit of the basic control unit according to embodiment 2.

FIG. 11 is a block diagram showing the configuration of the voltage information calculation unit 214A of the basic control unit 21A.

As shown in FIG. 11, the voltage information calculation unit 214A includes a minimum value calculation unit 31, a comparison unit 32, a storage unit 33, and a switchover unit 34.

The voltage information calculation unit 214A receives the capacitor voltage totals VcA (VcAPu, VcAPv, VcAPw, VcANu, VcANv, VcANw) for the respective arms outputted from the arm total detection unit 212, and the arm voltage commands VA* (VAPu*, VAPv*, VAPw*, VANu*, VANv*, VANw*) outputted from the arm voltage command calculation unit 223. Then, for each arm, the arm voltage command VA* is subtracted from the capacitor voltage total VcA, to calculate a control margin Km (KmPu, KmPv, KmPw, KmNu, KmNv, KmNw).

Then, the voltage information calculation unit 214A calculates a voltage information value Kmmin on the basis of a minimum control margin Kmmina which is the minimum value among the control margins Km for the respective arms, and outputs the voltage information value Kmmin at an update cycle that is an integer multiple of the control cycle of the control device 20. That is, the voltage information value Kmmin outputted from the voltage information calculation unit 214A is a value based on the capacitor voltage total VcA for one of the arms in the power converter 10.

The minimum value calculation unit 31 outputs the minimum control margin Kmmina which is the minimum value among the inputted control margins Km for the respective arms. The storage unit 33 stores the voltage information value Kmmin which is the output of the voltage information calculation unit 214A, and outputs the stored value as a held value Kmminz after one update cycle. The comparison unit 32 compares the minimum control margin Kmmina from the minimum value calculation unit 31 with the held value Kmminz from the storage unit 33, and outputs a switchover signal 32a to the switchover unit 34. A positive set value αa is added to the held value Kmminz, the switchover unit 34 selects one of the post-addition held value (Kmminz+αa) or the minimum control margin Kmmina by the switchover signal 32a, and the selected value is outputted as the voltage information value Kmmin from the voltage information calculation unit 214A.

In a case of (Kmmina≤Kmminz), the comparison unit 32 outputs 1 as the switchover signal 32a, the switchover unit 34 selects the minimum control margin Kmmina, and the minimum control margin Kmmina is outputted as the voltage information value Kmmin from the voltage information calculation unit 234A.

In a case of (Kmmina>Kmminz), the comparison unit 32 outputs 0 as the switchover signal 32a, the switchover unit 34 selects the post-addition held value (Kmminz+αa), and the value (Kmminz+αa) is outputted as the voltage information value Kmmin from the voltage information calculation unit 214A.

The positive set value aa is a value smaller than a difference (Kmmina−Kmminz) between the minimum control margin Kmmina and the held value Kmminz. For example, the set value aa may be set at a constant X, and if the value (Kmmina−Kmminz) is not greater than the constant X, ca may be set at 0.

Figure 12:
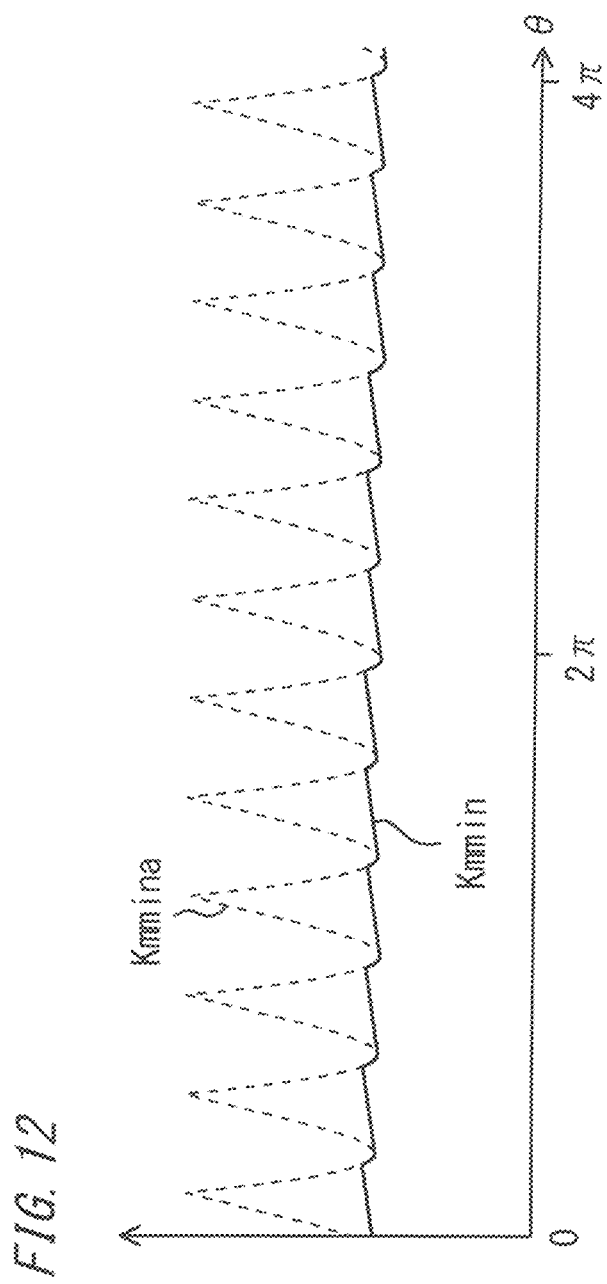
FIG. 12 is a waveform diagram illustrating a voltage information value according to embodiment 2.

FIG. 12 is a waveform diagram illustrating the voltage information value Kmmin. The capacitor voltage Vc which is the instantaneous voltage of each DC capacitor 13 fluctuates in accordance with ripple voltage, and the minimum value (minimum control margin Kmmina) of the control margins Km obtained by subtracting the arm voltage commands VA* from the capacitor voltage totals VcA for the respective arms, fluctuates with respect to the time axis, as shown by a dotted line in FIG. 12. The voltage information value Kmmin shown by a solid line becomes such a value as to represent an envelope of local minimums of the minimum control margin Kmmina with respect to the time axis.

Figure 13:
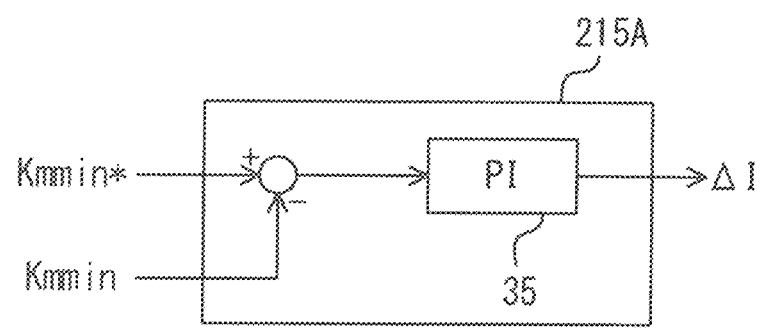
FIG. 13 is a block diagram showing the configuration of an overall voltage control unit of the basic control unit according to embodiment 2.

FIG. 13 is a block diagram snowing the configuration of the overall voltage control unit 215A of the basic control unit 21A.

As shown in FIG. 13, the overall voltage control unit 215A receives the voltage information value Kmmin outputted from the voltage information calculation unit 214A and a predetermined lower limit value Kmmin*. Then, a deviation obtained by subtracting the lower limit value Kmmin* from the voltage information value Kmmin is controlled to become close to 0 by the PI controller 35, and thus the current value ΔI is outputted.

That is, the outputted current value ΔI is such a current command value that active power for changing the voltage total value of all the DC capacitors 13 in the power converter 10 so that the voltage information value Kmmin becomes close to the lower limit value Kmmin*, flows in/out.

The current value ΔI is inputted to the current command generation unit 216, and thus, as in the above embodiment 1, increases or reduces at least one of the AC current command Iac* and the DC current command Idc*, thereby changing the voltage total value of all the DC capacitors 13 in the power converter 10. As a result, the voltage information value Kmmin becomes close to the lower limit value Kmmin*.

As described above, in this embodiment, the voltage information calculation unit 214A is provided for calculating the voltage information value Kmmin on the basis of the minimum control margin Kmmina which is the minimum value of the control margins Km for the respective arms, and the overall voltage control unit 215A is provided for changing the voltage total value of all the DC capacitors 13 so that the voltage information value Kmmin becomes close to the predetermined lower limit value Kmmin*. Therefore, it is possible to achieve voltage reduction of the DC capacitors 13 while ensuring the minimum necessary control margin Km for all the arms.

If the control margin Km obtained by subtracting the arm voltage command VA* from the capacitor voltage total VcA for each arm becomes smaller than the lower limit value Kmmin* and thus becomes, for example, a negative value, the power converter 10 comes into an overmodulation state in which desired voltage cannot be outputted. In this embodiment, without causing such an overmodulation state, the voltages of the DC capacitors 13 can be made as small as possible.

Thus, loss in each converter cell 11, e.g., switching loss occurring in the switching elements Q1, Q2 or loss occurring in a resistance element (e.g., voltage detector 14) connected in parallel to the DC capacitor 13, can be reduced, so that conversion efficiency of the power conversion device 1 is improved.

Embodiment 3

In the above embodiment 1, the voltage information value Vcmin based on the minimum voltage value Vcmina of the capacitor voltages Vc is used, and in the above embodiment 2, the voltage information value Kmmin based on the minimum control margin Kmmina of the control margins Km for the respective arms is used. In the present embodiment, two kinds of voltage information values, i.e., the voltage information value Vcmin based on the minimum voltage value Vcmina and a voltage information value Kmcmin relevant to the control margins Km for the respective arms, are used to change the voltage total value of all the DC capacitors 13.

Also in embodiment 3, the same power converter 10 as in the above embodiment 1 is used, and the control device 20 includes a basic control unit 21B, and the same arm control units 22Pu, 22Nu, 22Pv, 22Nv, 22Pw, 22Nw as in the above embodiment 1 respectively provided for the arms Pu, Hu, Pv, Nv, Pw, Nw.

Figure 14:
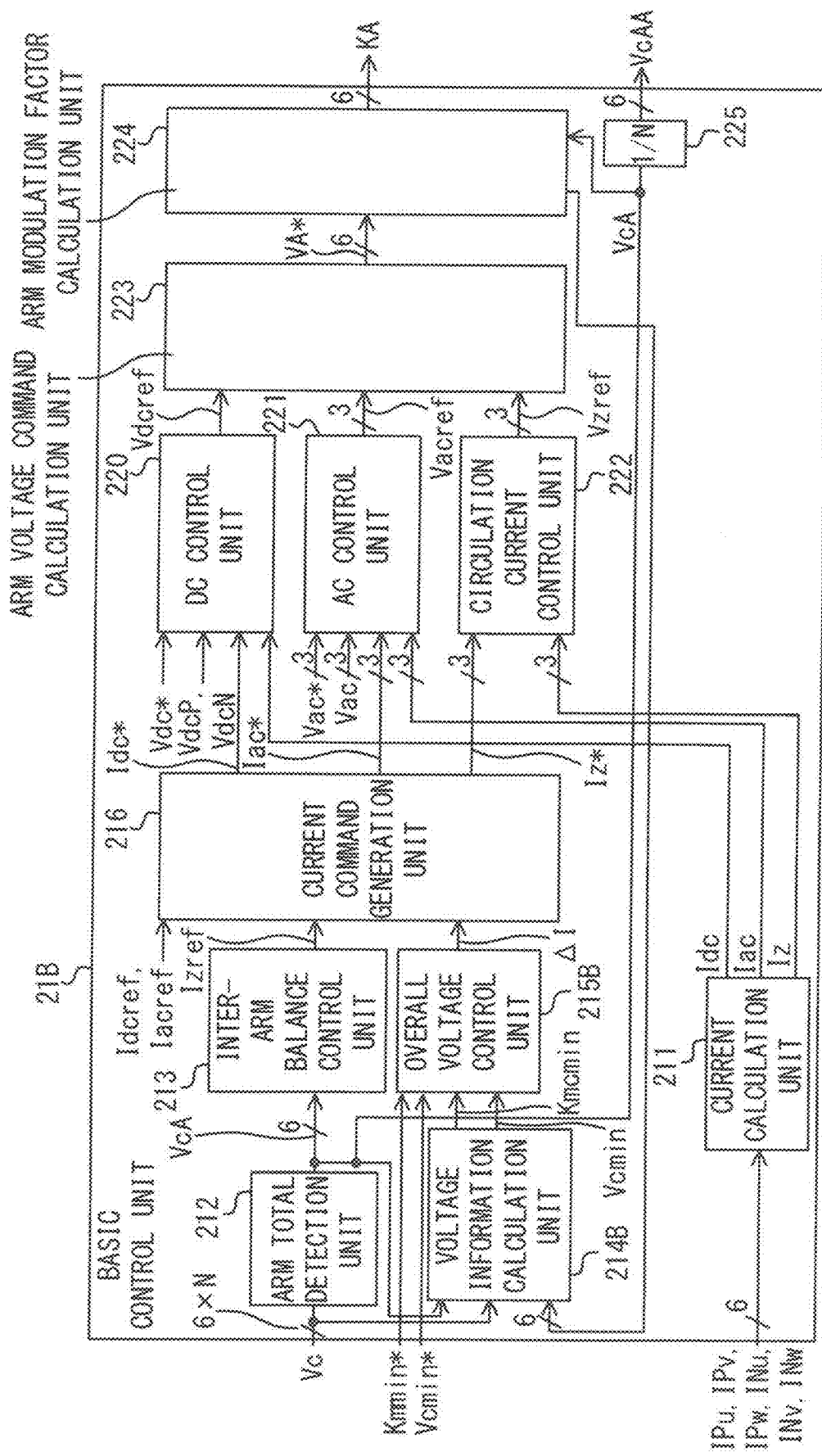
FIG. 14 is a block diagram showing the configuration of a basic control unit of a control device according to embodiment 3.

FIG. 14 is a block diagram showing the configuration of the basic control unit 21b of the control device 20 according to embodiment 3.

As shown in FIG. 14, the basic control unit 21B includes the current calculation unit 213, the arm total detection unit 212, the inter-arm balance control unit 213, a voltage information calculation unit 214B, an overall voltage control unit 215B, and the current command generation unit 216. Further, the basic control unit 218 includes the DC control unit 220, the AC control unit 221, the circulation current control unit 222, the arm voltage command calculation unit 223, the arm modulation factor calculation unit 224, and the divider 225.

The voltage information calculation unit 214B and the overall voltage control unit 215B will be described in detail below. The other parts are the same as in the above embodiment 1.

Figure 15:
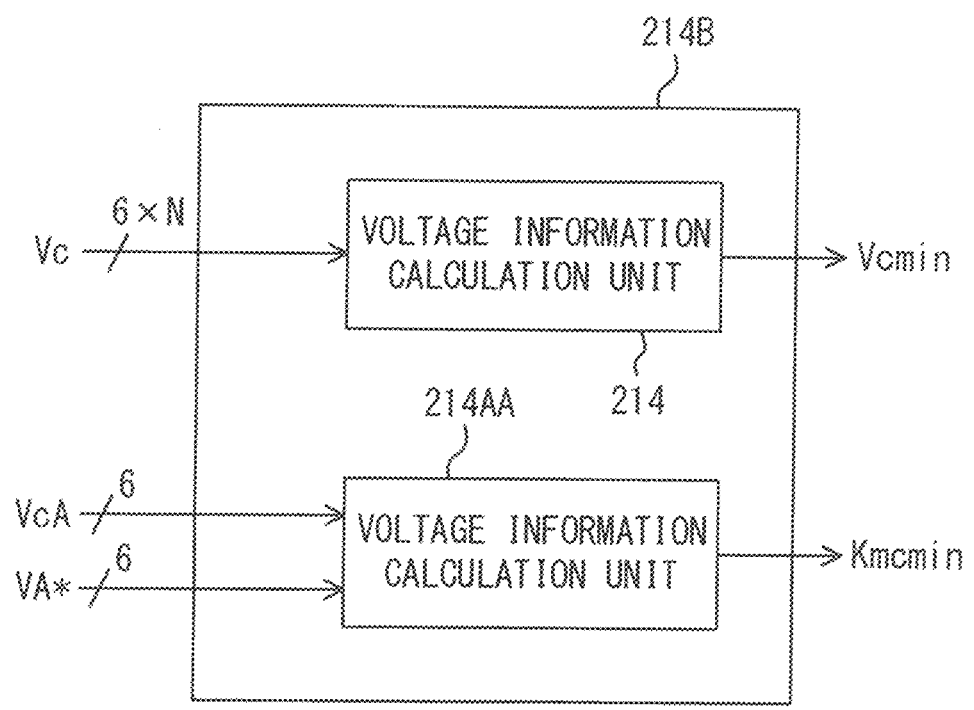
FIG. 15 is a block diagram showing the configuration of a voltage information calculation unit of the basic control unit according to embodiment 3.

FIG. 15 is a block diagram showing the configuration of the voltage information calculation unit 214B of the basic control unit 216.

As shown in FIG. 15, the voltage information calculation unit 214B includes, as a first voltage information calculation unit, the same voltage information calculation unit 214 as in the above embodiment 1, and includes, as a second voltage information calculation unit, a voltage information calculation unit 214AA.

The voltage information calculation unit 214B receives the capacitor voltages Vc of all the DC capacitors 13 in the power converter 10, the capacitor voltage totals VcA for the respective arms outputted from the arm total detection unit 212, and the arm voltage commands VA* for the respective arms outputted from the arm voltage command calculation unit 223. Then, the voltage information calculation unit 214B calculates and outputs the voltage information value Vcmin as a first voltage information value, and the voltage information value Kmcmin as a second voltage information value.

The capacitor voltages Vc are inputted to the voltage information calculation unit 214. As in the above embodiment 1, the voltage information calculation unit 214 calculates the voltage information value Vcmin on the basis of the minimum voltage value Vcmina which is the minimum value among the inputted capacitor voltages Vc.

The capacitor voltage totals VcA and the arm voltage commands VA* are inputted to the voltage information calculation unit 214AA. As in the above embodiment 2, the voltage information calculation unit 234AA calculates the control margins Km for the respective arms, and calculates the voltage information value Kmcmin through calculation using the control margins Km. The voltage information calculation unit 214AA will be described in detail below.

Figure 16:
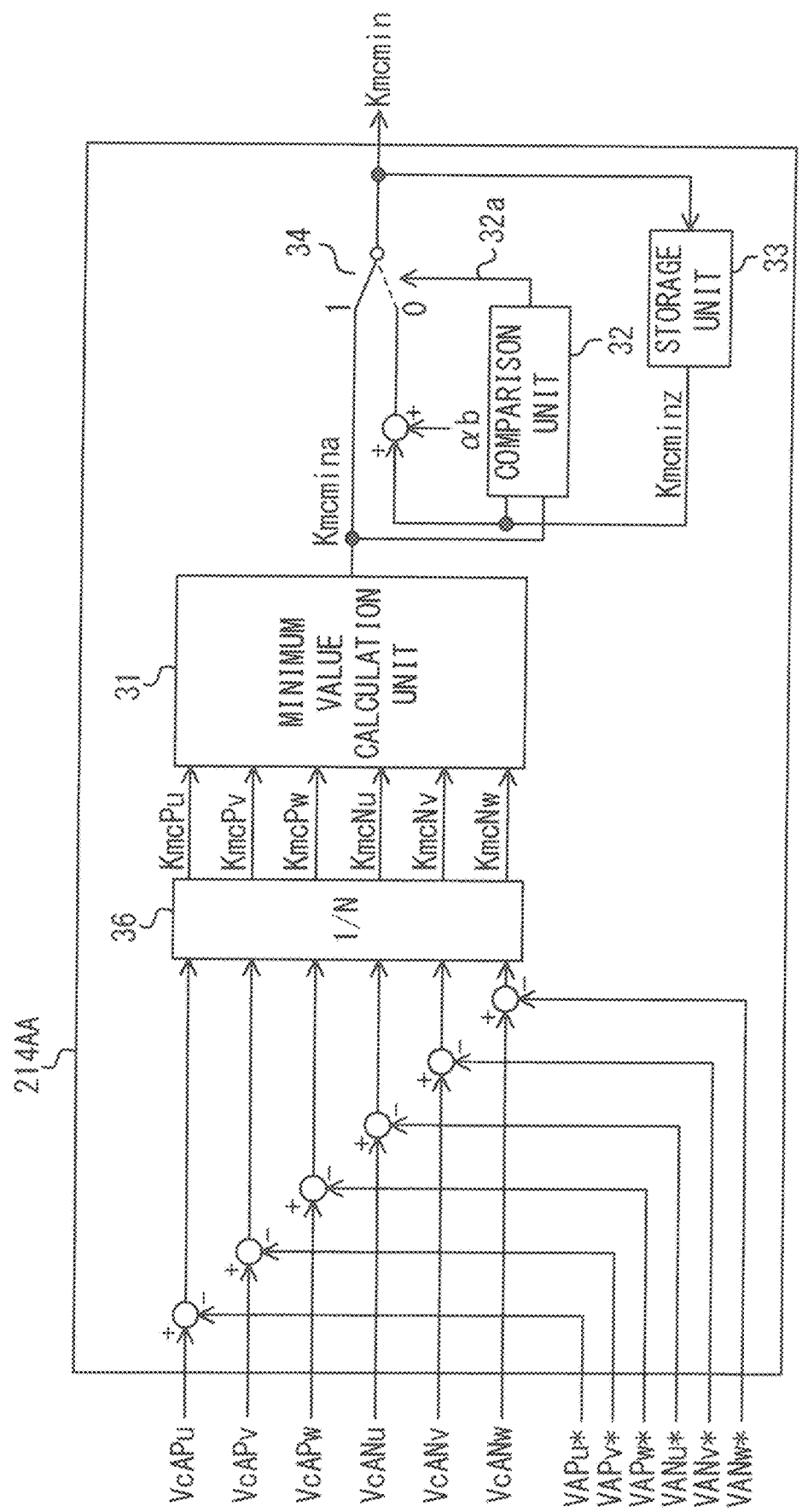
FIG. 16 is a block diagram showing the configuration of a second voltage information calculation unit in the voltage information calculation unit according to embodiment 3.

FIG. 16 is a block diagram snowing the configuration of the voltage information calculation unit (second voltage information, calculation unit) 214AA.

As shown in FIG. 16, the voltage information calculation unit 214AA includes a divider 36, the minimum value calculation unit 31, the comparison unit 32, the storage unit 33, and the switchover unit 34.

The voltage information calculation unit 214AA receives the capacitor voltage totals VcA (VcAPu, VcAPv, VcAPw, VcANu, VcANv, VcANw) for the respective arms outputted from the arm total detection unit 212, and the arm voltage commands VA* (VAPu*, VAPv*, VAPw*, VANu*, VANv*, VANw*) outputted from the arm voltage command calculation unit 223. Then, for each arm, the arm voltage command VA* is subtracted from the capacitor voltage total VcA, to calculate the control margin Km (KmPu, KmPv, KmPw, KmNu, KmNv, KmNw).

The divider 36 divides the control margin Km for each arm by the number N of the converter cells 11 in the arm, to calculate a control margin Kmc (KmcPu, KmcPv, KmcPw, KmcNu, KmcNv, KmcNw) per cell corresponding to each converter cell 11 in each arm. Hereinafter, the control margin Kmc per cell is referred to as cell control margin Kmc.

The minimum value calculation unit 31, the comparison unit 32, the storage unit 33, and the switchover unit 34 operate in the same manner as in the above embodiment 2.

That is, the minimum value calculation unit 31 outputs a minimum cell control margin Kmcmina which is the minimum value among the inputted cell control margins Kmc for the respective arms. The storage unit 33 stores the output of the voltage information calculation unit 214AA, and outputs the stored output as a held value Kmcminz after one update cycle. The comparison unit 32 compares the minimum cell control margin Kmcmina with the held value Kmcminz from the storage unit 33, and outputs the switchover signal 32a to the switchover unit 34.

In a case of (Kmcmina≤Kmcminz), the switchover unit 34 selects the minimum cell control margin Kmcmina as the voltage information value Kmcmin. In a case of (Kmcmina>Kmcminz), the switchover unit 34 selects a held value (Kmcminz+αb) to which a positive set value αb has been added, as the voltage information value Kmcmin.

The Positive set value αb is a value smaller than a difference between the minimum cell control margin Kmcmina and the held value Kmcminz.

Thus, the voltage information calculation unit 214AA calculates the voltage information value Kmcmin on the basis of the minimum cell control margin Kmcmina which is the minimum value among the cell control margins Kmc for the respective arms, and outputs the voltage information value Kmcmin at an update cycle that is an integer multiple of the control cycle of the control device 20.

Then, the voltage information calculation unit 214B having a combination of two kinds of voltage information calculation units 214, 214AA outputs two kinds of voltage information values Vcmin, Kmcmin.

Figure 17:
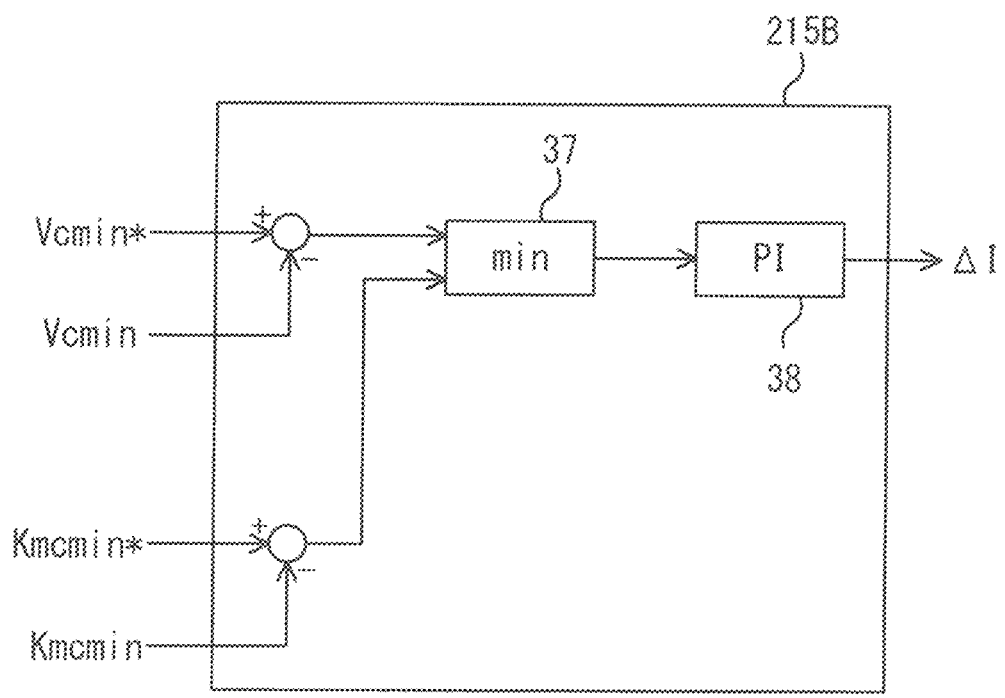
FIG. 17 is a block diagram showing the configuration of an overall voltage control unit of the basic control unit according to embodiment 3.

FIG. 17 is a block diagram showing the configuration of the overall voltage control unit 215B of the basic control unit 21B.

As shown in FIG. 17, the overall voltage control unit 215B receives the voltage information value Vcmin and the voltage information value Kmcmin outputted from the voltage information calculation unit 214B, and further receives the lower limit value Vcmin* as a predetermined first lower limit value for the voltage information value Vcmin, and a lower limit value Kmcmin* as a predetermined second lower limit value for the voltage information value Kmcmin. Then, a minimum value detection unit (min) 37 selects the smaller one of a deviation obtained by subtracting the lower limit value Vcmin* from the voltage information value Vcmin and a deviation obtained by subtracting the lower limit value Kmcmin* from the voltage information value Kmcmin. The selected deviation is controlled to become close to 0 by the PI controller 38, and thus the current value ΔI is outputted.

That is, the outputted current value ΔI is such a current command value that active power for changing the voltage total value of all the DC capacitors 13 in the power converter 10 so that the voltage information value Vcmin becomes close to the lower limit value Vcmin* and the voltage information value Kmcmin becomes close to the lower limit value Kmcmin*, flows in/out.

The current value ΔI is inputted to the current command generation unit 216, and thus, as in the above embodiment 1, increases or reduces at least one of the AC current command Iac* and the DC current command Idc*, thereby changing the voltage total value of all the DC capacitors 13 in the power converter 10. As a result, the voltage information value Vcmin becomes close to the lower limit value Vcmin* and the voltage information value Kmcmin becomes close to the lower limit value Kmcmin*.

As described above, in this embodiment, the voltage information calculation unit 214B calculates the voltage information value Vcmin on the basis of the minimum voltage value Vcmina of the capacitor voltages Vc and the voltage information value Kmcmin on the basis of the minimum value (minimum cell control margin Kmcmina) of the cell control margins Kmc for the respective arms. Then, the voltage total value of all the DC capacitors 13 in the power converter 10 is changed so that the voltage information value Vcmin becomes close to the lower limit value Vcmin* and the voltage information value Kmcmin becomes close to the lower limit value Kmcmin*.

Therefore, it is possible to achieve voltage reduction of the DC capacitors 13 while ensuring the minimum necessary voltage for all the capacitor voltages Vc as described in the above embodiment 1 and ensuring the minimum necessary control margin Km for all the arms as described in the above embodiment 2.

Thus, loss in each converter cell 11, e.g., switching loss occurring in the switching elements Q1, Q2 or loss occurring in a resistance element (e.g., voltage detector 14) connected in parallel to the DC capacitor 13, can be reduced, so that conversion efficiency of the power conversion device 1 is improved.

The function of the control device 20 in each of the above embodiments 1 to 3 is implemented by a processing circuit, for example.

Figure 18:
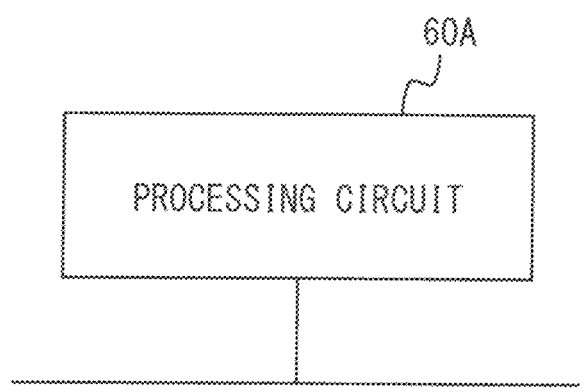
FIG. 18 is a configuration diagram showing an example of hardware for implementing functions of the control device according to any of embodiments 1 to 3.

FIG. 18 is a configuration diagram showing an example of hardware for implementing each function of the control device 20. In this case, the control device 20 is formed by a processing circuit 60A which is dedicated hardware.

The processing circuit 60A is, for example, a single circuit, a complex circuit, a programmed processor, a parallel-programmed processor, an application specific integrated circuit (ASIC), a field programmable gate array (FPGA), or a combination thereof.

Figure 19:
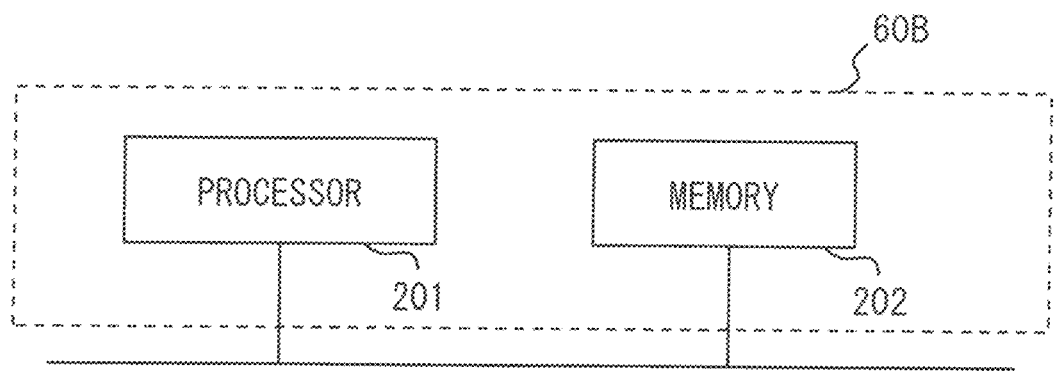
FIG. 19 is a configuration diagram showing another example of hardware for implementing functions of the control device according to any of embodiments 1 to 3.

FIG. 19 is a configuration diagram showing another example of hardware for implementing each function of the control device 20 in each of embodiments 1 to 3. In this case, a processing circuit 608 includes a processor 201 and a memory 202.

In the processing circuit 608, the function of the control device 20 is implemented by software, firmware, or a combination of software and firmware. The software and the firmware are described as a program and stored in the memory 202. The processor 201 reads and executes the program stored in the memory 202, to implement each function.

The program stored in the memory 202 can be considered to be a thing for causing a computer to execute the procedure or method in each unit described above. Here, the memory 202 is, for example, a nonvolatile or volatile semiconductor memory such as a random access memory (RAM), a read only memory (POM), a flash memory, an erasable programmable read only memory (EPROM), or an electrically erasable and programmable read only memory (EEPROM). Also, a magnetic disk, a flexible disk, an optical disc, a compact disc, a mini disc, a DVD, or the like may be used for the memory 202.

Of the functions of the control device 20 described above, some may be implemented by dedicated hardware and others may be implemented by software or firmware.

Thus, the processing circuit can implement the functions of the control device 20 described above by hardware, software, firmware, or a combination thereof.

Embodiment 4

In the above embodiments 1 to 3, the power converter 10 having a connection configuration of a double-star type is used, but the present disclosure is not limited thereto.

Figure 20:
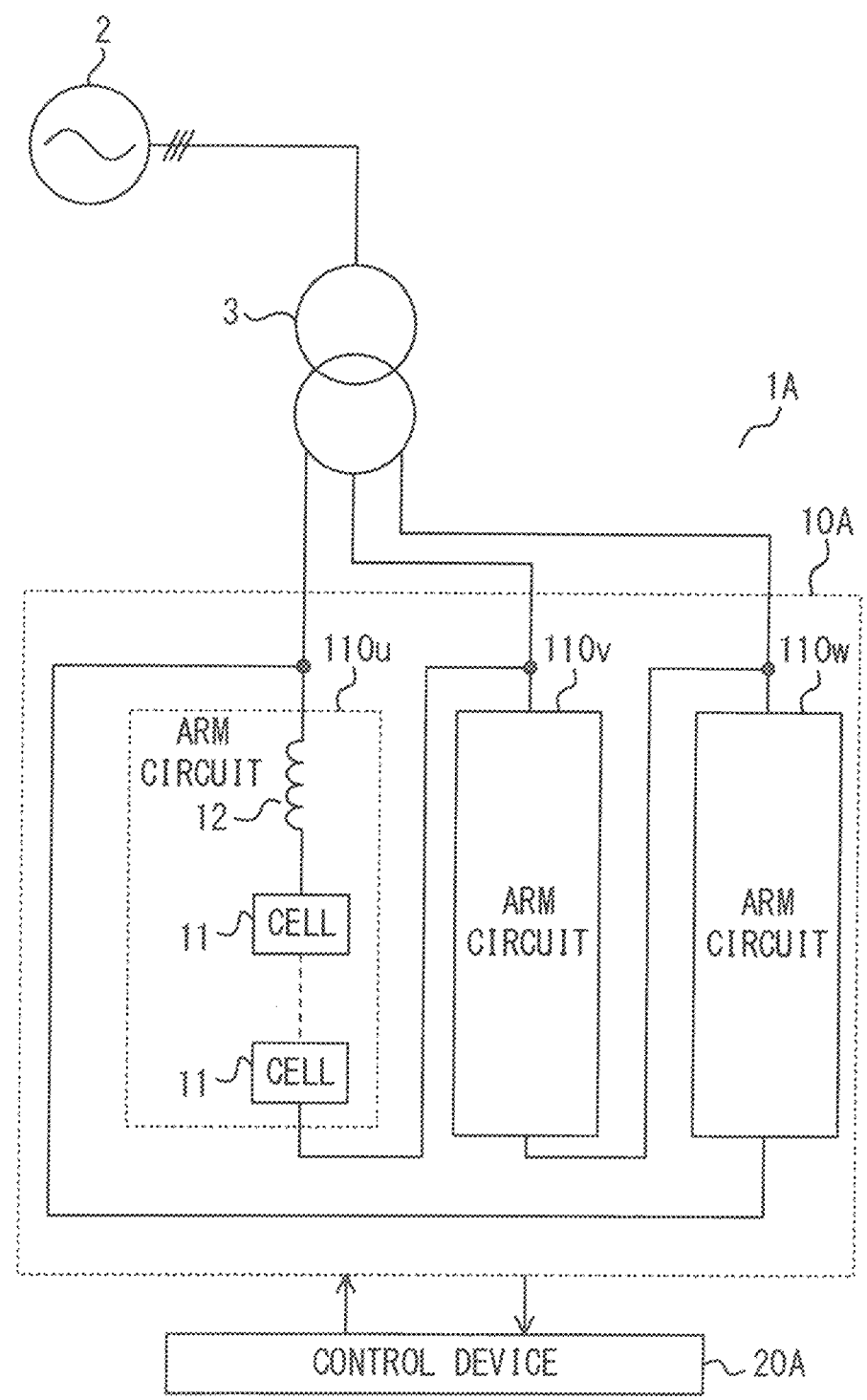
FIG. 20 shows the schematic configuration of a power conversion device according to embodiment 4.

FIG. 20 shows the schematic configuration of a power conversion device according to embodiment 4.

As shown in FIG. 20, a power conversion device 1A includes a power converter 10A which is a main circuit and a control device 20A for performing output control of the power converter 10A, and is connected to the AC grid 2 as a three-phase AC circuit.

The power converter 10A includes, as arms, arm circuits 110u, 110v, 110w (referred to as arm circuit 110 when they are collectively mentioned or any of them is mentioned), for a plurality of phases (in this case, three phases U, V, W) forming AC. The three arm circuits 110u, 110v, 110w are delta-connected, and AC input terminals thereof are connected to the AC grid 2 via the transformer 3.

The arm circuits 110u, 110v, 110w have the same configuration and are each formed by connecting a plurality of (N) converter cells 11 and a reactor 12 in series.

In this case, the power converter 10A has a connection configuration called a single-delta type, and the power conversion device 1A is mainly used for a static synchronous compensator.

Also in this embodiment, as in the above embodiment 1, the control device 20A includes the basic control unit and the arm control units respectively provided for the arm circuits 110. In the basic control unit, the voltage information calculation unit is provided for calculating the voltage information value Vcmin on the basis of the minimum voltage value of the capacitor voltages Vc, the overall voltage control unit is provided for changing the voltage total value of all the DC capacitors 13 so that the voltage information value Vcmin becomes close to the predetermined lower limit value Vcmin*, and control is performed in the same manner. Thus, it is possible to achieve voltage reduction while ensuring the minimum necessary voltage for all the capacitor voltages Vc, whereby loss in the converter cells 11 is reduced and conversion efficiency of the power conversion device 1A is improved.

In the above example, the control in embodiment 1 is applied. However, the control in embodiment 2 or embodiment 3 may be applied, whereby the same effects are obtained.

Figure 21:
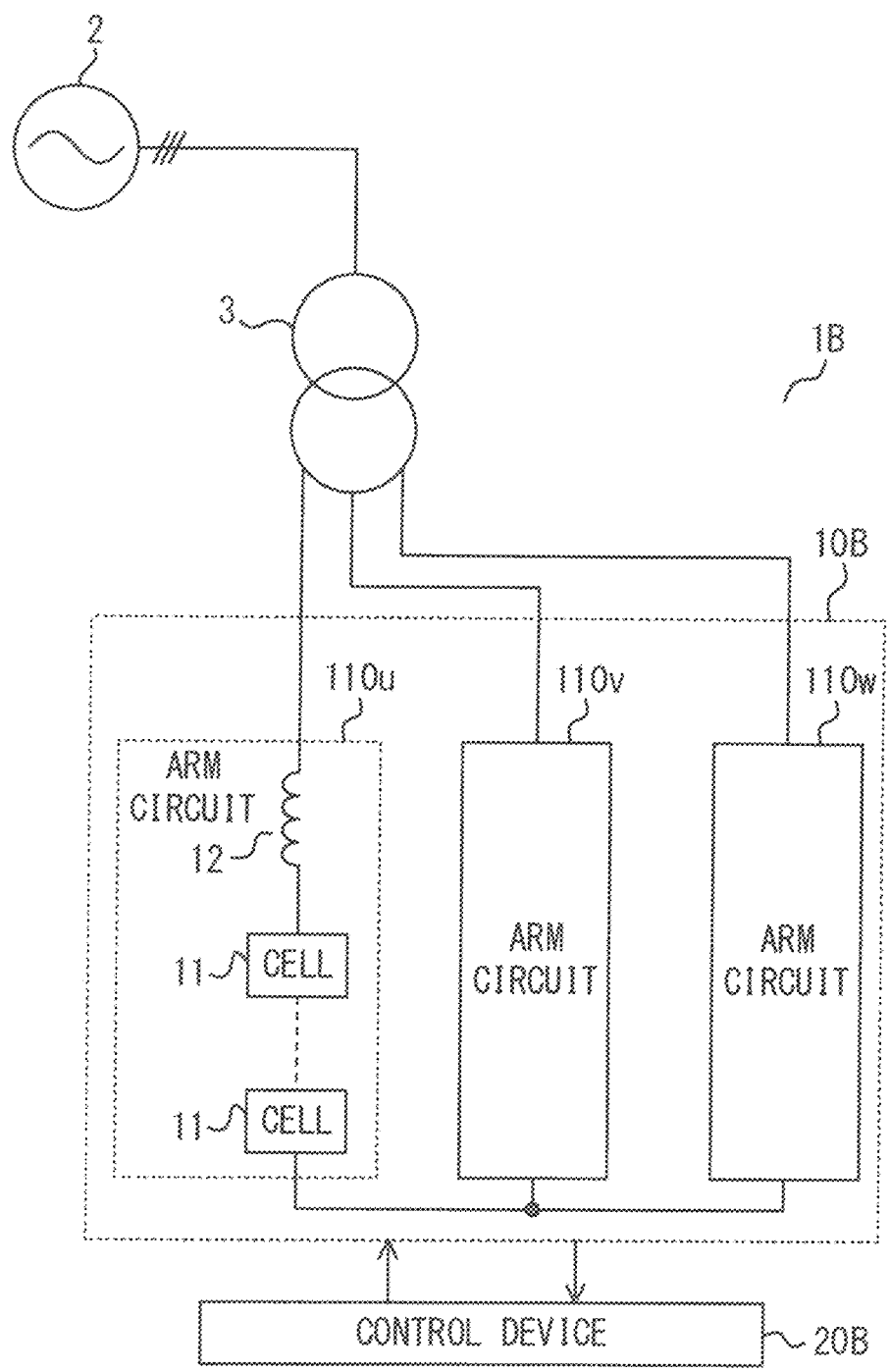
FIG. 21 shows the schematic configuration of a power conversion device according to another example of embodiment 4.

FIG. 21 shows the schematic configuration of a power conversion device according to another example of embodiment 4.

As shown in FIG. 21, a power conversion device 1B includes a power converter 10B which is a main circuit and a control device 20B for performing output control of the power converter 10B, and is connected to the AC grid 2 as a three-phase AC circuit.

The power converter 10B is formed by star-connecting three arm circuits 110u, 110v, 110w, and the AC input terminals thereof are connected to the AC grid 2 via the transformer 3.

In this case, the power converter 10B has a connection configuration called a single-star type, and the power conversion device 1A is mainly used for a static synchronous compensator.

Also in this case, as in the power conversion device 1A shown in FIG. 20, the control in each of the above embodiments 1 to 3 is applied, and thus it is possible to achieve voltage reduction for all the capacitor voltages Vc, whereby loss in the converter cells 11 can be reduced and conversion efficiency of the power conversion device 1B can be improved.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1, 1A, 1B power conversion device
2 AC grid
10, 10A, 10B power converter
11 converter cell
13 DC capacitor
13 DC capacitor
20, 20A, 20B control device
26, 32 comparison unit
27, 33 storage unit
110u, 110v, 110w arm circuit
214, 214A, 2146, 214AA voltage information calculation unit
215, 215A, 215B overall voltage control unit
223 arm voltage command calculation unit
α, αa, αb set value
Q1 to Q6 switching element Pu, Nu, Pv, Nv, Pw, Nw arm
VA*, VAPu*, VANu*, VAPv*, VANV*, VAPw*, VANw* arm voltage command
Vc capacitor voltage
Vcmina minimum voltage value
VcA, VcAPu, VcANu, VcAPv, VcANv, VcAPw, VcANw capacitor voltage total
Vcmin, Kmmin, Kmcmin voltage information value
Vcmin*, Kmmin*, Kmcmin* lower limit value
ΔI current value
Km, KmPu, KmPv, KmPw, KmNu, KmNv, KmNw control margin
Kmmina minimum control margin
Kmc, KmcPu, KmcPv, KmcPw, KmcNu, KmcNv, KmcNw cell control margin
Kmcmina minimum cell control margin

The invention claimed is:

1. A power conversion device comprising:
a power converter which is connected to an AC circuit having a plurality of phases and performs power conversion; and
a control device for performing output control of the power converter, wherein
the power converter includes, for each phase, at least one arm connected to the corresponding phase of the AC circuit, the arms each being formed by connecting, in series, a plurality of converter cells each having a plurality of semiconductor switching elements and a power storage element,
the control device generates an output voltage command for each arm of the power converter, to perform output control of the power converter, and includes a voltage information calculation circuitry to calculate a voltage information value on the basis of voltage of at least one of the power storage elements in the power converter, and an overall voltage control circuitry to change a voltage total value of all the power storage elements in the power converter so that the voltage information value becomes close to a predetermined lower limit value, and
the voltage information calculation circuitry calculates, for each arm, a control margin by subtracting the output voltage command for the arm from a voltage sum of all the power storage elements in the arm, and calculates the voltage information value on the basis of a minimum value among the control margins for the respective arms.

2. The power conversion device according to claim 1, wherein
the control device calculates a current value for changing the voltage total value by the overall voltage control circuitry, generates a current command for the power converter on the basis of the current value, and generates the output voltage command for each arm of the power converter on the basis of the current command.

3. The power conversion device according to claim 1, wherein
the voltage information calculation circuitry outputs the voltage information value at an update cycle that is an integer multiple of a control cycle of the control device, and includes a storage circuitry to store the output and a comparison circuitry to compare the stored previous output with the minimum value, and
in a case where the minimum value is not greater than the previous output, the voltage information calculation unit outputs the minimum value as the voltage information value, and otherwise, the voltage information calculation unit outputs a value obtained by adding a positive set value to the previous output, as the voltage information value.

4. The power conversion device according to claim 3, wherein
the positive set value is a value smaller than a difference between the minimum value and the previous output.

5. The power conversion device according to claim 2, wherein
the voltage information calculation circuitry outputs the voltage information value at an update cycle that is an integer multiple of a control cycle of the control device, and includes a storage circuitry to store the output and a comparison circuitry to compare the stored previous output with the minimum value, and
in a case where the minimum value is not greater than the previous output, the voltage information calculation unit outputs the minimum value as the voltage information value, and otherwise, the voltage information calculation unit outputs a value obtained by adding a positive set value to the previous output, as the voltage information value.

6. The power conversion device according to claim 5, wherein
the positive set value is a value smaller than a difference between the minimum value and the previous output.

7. A power conversion device comprising:
a power converter which is connected to an AC circuit having a plurality of phases and performs power conversion; and
a control device for performing output control of the power converter, wherein
the power converter includes, for each phase, at least one arm connected to the corresponding phase of the AC circuit, the arms each being formed by connecting, in series, a plurality of converter cells each having a plurality of semiconductor switching elements and a power storage element,
the control device generates an output voltage command for each arm of the power converter, to perform output control of the power converter, and includes a voltage information calculation circuitry to calculate a voltage information value on the basis of voltage of at least one of the power storage elements in the power converter, and an overall voltage control circuitry to change a voltage total value of all the power storage elements in the power converter so that the voltage information value becomes close to a predetermined lower limit value,
the voltage information calculation circuitry outputs the voltage information value at an update cycle that is an integer multiple of a control cycle of the control device, and includes a storage circuitry to store the output and a comparison circuitry to compare the stored previous output with a minimum value among voltages of all the power storage elements in the power converter, and
in a case where the minimum value is not greater than the previous output, the voltage information calculation unit outputs the minimum value as the voltage information value, and otherwise, the voltage information calculation unit outputs a value obtained by adding a positive set value to the previous output, as the voltage information value.

8. The power conversion device according to claim 7, wherein
the positive set value is a value smaller than a difference between the minimum value and the previous output.

9. The power conversion device according to claim 7, wherein
the control device calculates a current value for changing the voltage total value by the overall voltage control circuitry, generates a current command for the power converter on the basis of the current value, and generates the output voltage command for each arm of the power converter on the basis of the current command.

10. The power conversion device according to claim 9, wherein
the positive set value is a value smaller than a difference between the minimum value and the previous output.

11. A power conversion device comprising:
a power converter which is connected to an AC circuit having a plurality of phases and performs power conversion; and
a control device for performing output control of the power converter, wherein
the power converter includes, for each phase, at least one arm connected to the corresponding phase of the AC circuit, the arms each being formed by connecting, in series, a plurality of converter cells each having a plurality of semiconductor switching elements and a power storage element,
the control device generates an output voltage command for each arm of the power converter, to perform output control of the power converter, and includes a voltage information calculation circuitry to calculate a voltage information value on the basis of voltage of at least one of the power storage elements in the power converter, and an overall voltage control circuitry to change a voltage total value of all the power storage elements in the power converter so that the voltage information value becomes close to a predetermined lower limit value,
the voltage information calculation circuitry
calculates a first voltage information value and a second voltage information value as the voltage information value,
calculates the first voltage information value on the basis of a minimum value among voltages of all the power storage elements in the power converter, and
for each arm, calculates a control margin per cell by subtracting the output voltage command for the arm from a voltage sum of all the power storage elements in the arm and then dividing a result thereof by a number of the converter cells in the arm, and calculates the second voltage information value on the basis of a minimum value among the control margins per cell for the respective arms, and the overall voltage control circuitry
uses, as the lower limit value, a first lower limit value for the first voltage information value and a second lower limit value for the second voltage information value, and
changes the voltage total value of all the power storage elements in the power converter so that the first voltage information value becomes close to the first lower limit value and the second voltage information value becomes close to the second lower limit value.

12. The power conversion device according to claim 11, wherein
the overall voltage control circuitry changes the voltage total value of all the power storage elements so that a smaller one of a difference obtained by subtracting the first lower limit value from the first voltage information value and a difference obtained by subtracting the second lower limit value from the second voltage information value, becomes close to 0.

13. The power conversion device according to claim 11, wherein
the control device calculates a current value for changing the voltage total value by the overall voltage control circuitry, generates a current command for the power converter on the basis of the current value, and generates the output voltage command for each arm of the power converter on the basis of the current command.

14. The power conversion device according to claim 13, wherein
the overall voltage control circuitry changes the voltage total value of all the power storage elements so that a smaller one of a difference obtained by subtracting the first lower limit value from the first voltage information value and a difference obtained by subtracting the second lower limit value from the second voltage information value, becomes close to 0.

* * * * *